(12) United States Patent
Nyu

(10) Patent No.: US 8,355,680 B2
(45) Date of Patent: Jan. 15, 2013

(54) RADIO WAVE PROPAGATION ANALYSIS RESULT DISPLAY SYSTEM

(75) Inventor: Takayuki Nyu, Minato-ku (JP)

(73) Assignee: NEC Corporation, Tokyo (JP)

( * ) Notice: Subject to any disclaimer, the term of this patent is extended or adjusted under 35 U.S.C. 154(b) by 392 days.

(21) Appl. No.: 12/747,124

(22) PCT Filed: Dec. 10, 2008

(86) PCT No.: PCT/JP2008/072389
§ 371 (c)(1),
(2), (4) Date: Jun. 9, 2010

(87) PCT Pub. No.: WO2009/075282
PCT Pub. Date: Jun. 18, 2009

(65) Prior Publication Data
US 2010/0267343 A1  Oct. 21, 2010

(30) Foreign Application Priority Data
Dec. 10, 2007  (JP) .................................. 2007-318062

(51) Int. Cl.
*H04B 17/00* (2006.01)

(52) U.S. Cl. ..................... 455/67.11; 455/423; 455/67.7; 455/446; 455/67.16; 324/76.14; 702/2

(58) Field of Classification Search .................. 455/423, 455/446, 67.7, 67.11, 67.16; 324/76.14; 702/2
See application file for complete search history.

(56) References Cited

U.S. PATENT DOCUMENTS

| 2002/0002046 A1* | 1/2002 | Okanoue et al. | 455/423 |
| 2005/0088165 A1* | 4/2005 | Watanabe et al. | 324/76.14 |
| 2007/0093212 A1* | 4/2007 | Sugahara | 455/67.16 |

FOREIGN PATENT DOCUMENTS

| CN | 1240546 A | 1/2000 |
| CN | 101120524 A | 2/2008 |
| JP | 7-235900 A | 9/1995 |
| JP | 8-194029 A | 7/1996 |
| JP | 2001-094502 A | 4/2001 |
| JP | 2001-099880 A | 4/2001 |
| JP | 2002-044034 A | 2/2002 |
| JP | 2006-352385 A | 12/2006 |
| JP | 4217976 B2 | 2/2009 |
| WO | 9831112 A2 | 7/1998 |
| WO | 2005/088868 A1 | 9/2005 |

OTHER PUBLICATIONS

Pi, Kun-bao et al., "Research on the model of indoor field strength prediction in multi-floor buildings," Information Technology, vol. 28, No. 12, Dec. 2004, pp. 72-75.

(Continued)

*Primary Examiner* — April G Gonzales
(74) *Attorney, Agent, or Firm* — Sughrue Mion, PLLC

(57) ABSTRACT

A radio wave propagation analysis result display system calculates an analysis result of radio wave propagation inside a building by subtracting a transmission loss caused by an external wall of the building from an analysis result of radio wave propagation outside the building, and displays a map capable of expressing the height, on which the calculated radio wave propagation analysis result is displayed and superimposed on the building, on a display device.

33 Claims, 24 Drawing Sheets

OTHER PUBLICATIONS

LiLi Zhang Qiaomei, "A research of 3D-FDTD based on EM wave propagation in indoor circumstance," Journal of Jilin Teachers Institute of Engineering and Technology, vol. 20, No. 12, Dec. 2004, pp. 13-16.

Tang, Liang et al. "Time-frequency Description of Window Textures and its Application in Building Extraction," Journal of Image and Graphics, vol. 9, No. 10, Oct 2004, 8 pages.

Fang Fei, "A Mixed Method for the Prediction of Wave Propagation from Outdoor to Indoor Sites," Sep. 15, 2005, pp. 56-59.

Chinese Search Report issued on Aug. 17, 2012 by the State Intellectual Property Office of the People's Republic of China corresponding to Chinese Application No. 2008801201547.

* cited by examiner

| | Ec/No OF EACH CELL AT EACH OBSERVATION POINT | | | |
|---|---|---|---|---|
| OBSERVATION POINT $\alpha$ | BASE STATION A | BASE STATION B | BASE STATION C | .... |
| OBSERVATION POINT $\beta$ | a1 | b1 | c1 | |
| OBSERVATION POINT $\gamma$ | a2 | b2 | c2 | |
| | a3 | b3 | c3 | |
| .... | | | | |

RADIO WAVE PROPAGATION ANALYSIS RESULT DISPLAY SYSTEM

REFERENCE TO RELATED APPLICATION

The present invention is based upon and claims the benefit of the priority of Japanese Patent Application No. 2007-318062 filed on Dec. 10, 2007, the disclosure of which is incorporated herein in its entirety by reference thereto.

TECHNICAL FIELD

The present invention relates to a radio wave propagation analysis result display system, and particularly to a radio wave propagation analysis result display system that derives and displays the radio wave characteristics inside a building from a result of an analysis of radio wave propagation outside the building.

BACKGROUND ART

In designing of a mobile telephone network, the placement and performance of radio base stations must be designed so as not to create any radio wave dead zone with a minimum required number of radio base stations, and in order to achieve this, radio wave propagation analysis is performed.

There are two types of known techniques for deriving the electric field intensity distribution of a radio wave emitted from the antenna of a radio base station by radio wave propagation analysis: statistical methods and geometric optics methods. In a statistical method, trends of radio wave propagation characteristics are derived by actually measuring the electric field intensity in various conditions, and the electric field intensity distribution is estimated from the results. Meanwhile, in a geometric optics method, also known as the ray-trace method, a radio wave emitted from the antenna is likened to and is expressed as a set of rays, and the electric field intensity distribution is estimated by deriving all the losses including the propagation distance loss between the transmission point and the reception point, and the reflection loss and transmission loss caused by obstacles in the middle. Further, the geometric optics methods are roughly divided into imaging methods and their improved versions, ray launching methods.

For instance, Patent Document 1 describes a radio propagation simulator in which reception points are disposed on the wall on each floor of a building, the reception level of each reception point is calculated using the ray-trace method, and a two-dimensional map and three-dimensional map are color-coded and displayed according to the reception level.

[Patent Document 1] Japanese Patent Kokai Publication No. JP-P2002-44034A

SUMMARY

The entire disclosure of the aforementioned Patent Document 1 is incorporated herein by reference thereto. The following analysis is given by the present invention.

According to the radio propagation simulator described in Patent Document 1, how the radio wave has reached the side of each floor of a building can be calculated based on map data of buildings and roads, and the calculation results can be simply displayed on two- and three-dimensional maps.

However, in an area where buildings exist, in most cases, terminals that communicate with the radio base stations are inside the buildings. Therefore, in the method that displays how the radio wave has reached the side of each floor of the building, the status of the radio wave inside the building cannot be grasped.

Generally speaking, in a radio wave propagation analysis method such as the ray launching method, whether or not a transmitted wave exists can be specified as a calculation condition, and it is possible to estimate the status of the radio wave inside a building in principle by taking transmitted waves into consideration. However, since a ray is divided into many lines, the calculation of transmitted waves requires an enormous amount of time.

Therefore, there is a need in the art to provide a radio wave propagation analysis result display system capable of easily calculating and displaying the characteristics of a radio wave that has reached inside a building.

In a first aspect of the present invention, there is provided a radio wave propagation analysis result display system, comprising: a display information generation unit that calculates an analysis result of radio wave propagation inside a building by subtracting a transmission loss caused by an external wall of the building from an analysis result of radio wave propagation outside the building, and that displays a map capable of expressing the height, on which the calculated radio wave propagation analysis result is displayed and superimposed on the building, on a display device.

In a second aspect of the present invention, there is provided a radio wave propagation analysis result display method, comprising:

calculating an analysis result of radio wave propagation inside a building by subtracting a transmission loss caused by an external wall of the building from an analysis result of radio wave propagation outside the building; and displaying a map capable of expressing the height, on which the calculated radio wave propagation analysis result is displayed and superimposed on the building, on a display device.

In a third aspect of the present invention, there is provided a radio wave propagation analysis result display program, causing a computer to execute: a display information generation processing of calculating an analysis result of radio wave propagation inside a building by subtracting a transmission loss caused by an external wall of the building from an analysis result of radio wave propagation outside the building, and displaying a map capable of expressing the height, on which the calculated radio wave propagation analysis result is displayed and superimposed on the building, on a display device.

In a mode of the present invention, there is provided a radio wave propagation analysis result display system, further comprising:

an analysis result storage unit that stores the analysis result of the radio wave propagation outside the building; and a display condition storage unit that stores the transmission loss caused by an external wall of the building, wherein the display information generation unit calculates the analysis result of the radio wave propagation inside the building by subtracting the transmission loss caused by the external wall of the building stored in the display condition storage unit from the analysis result of the radio wave propagation outside the building stored in the analysis result storage unit.

In a mode of the present invention, there is provided a radio wave propagation analysis result display method, in the calculating, a display information generation unit calculates the analysis result of the radio wave propagation inside the building by subtracting the transmission loss caused by the external wall of the building stored in a display condition storage unit that stores the transmission loss caused by the external wall of the building from the analysis result of the radio wave propagation outside the building stored in an analysis result storage unit that stores the analysis result of the radio wave propagation outside the building.

The present invention provides the following advantage, but not restricted thereto. According to the present invention, an analysis result of radio wave propagation inside a building can be easily obtained by subtracting the value of a transmission loss caused by an external wall of the building from the value of an analysis result of 135 radio wave propagation outside the building.

Explanations of symbols are given in the following explanation.

PREFERRED MODES

First Exemplary Embodiment (Explanation of Structure)

Figure 1:
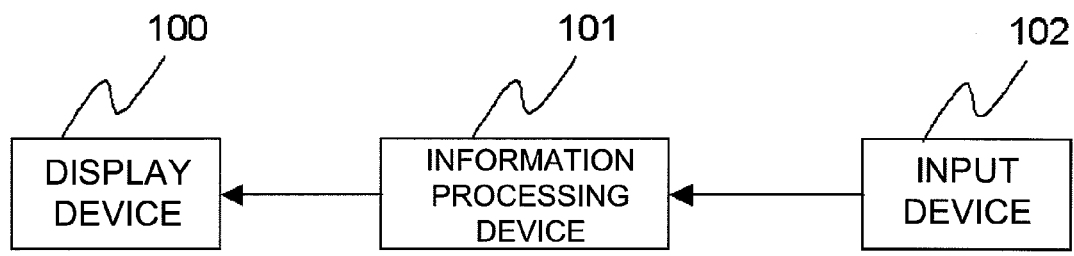
FIG. 1 is a block diagram of a radio wave propagation analysis result display system relating to a first exemplary embodiment.

With reference to FIG. 1, a radio wave propagation analysis result display system relating to a first exemplary embodiment comprises an information processing device 101, and an input device 102 and a display device 100, both connected thereto.

The input device 102 comprises a keyboard and is used for inputting instructions from a system user and data into the information processing device 101.

Figure 2:
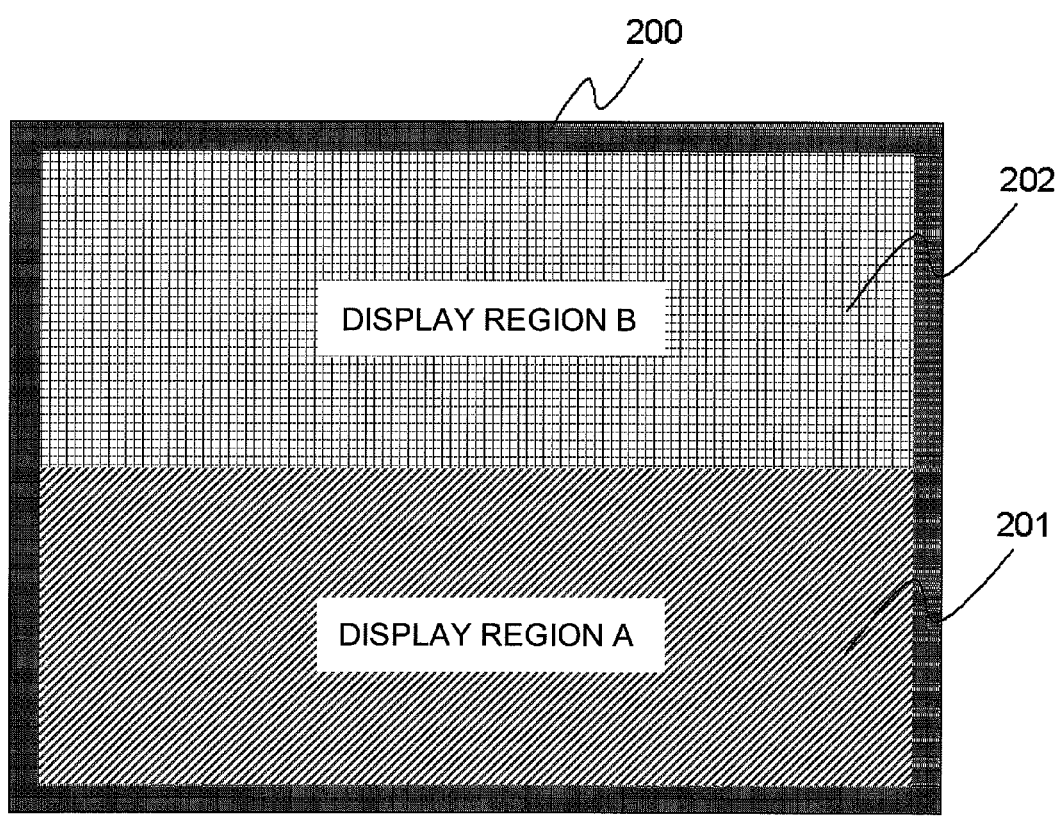
FIG. 2 is a drawing showing two display regions displayed on a display device in a radio wave propagation analysis result display system relating to a first exemplary embodiment.

The display device 100 comprises a liquid crystal display and is used for presenting the processing results of the information processing device 101 to a system user. With reference to FIG. 2, the display screen of the display device 100 is divided into display regions A201 and B202 when analysis result screen data is displayed. A two-dimensional map is displayed in the display region A201, a map expressing the height direction of a building is displayed in the display region B202, and analysis results are presented as images in each region. Here, as a method for providing two display regions, the method in which the display screen of the display device 100 is divided into two regions is described. However, instead of employing this method, two display devices may be used, having the display region A201 displayed on the screen of one display device and the display region B202 displayed on the screen of the other display device.

The information processing device 101 comprises at least one computer including a CPU and memory, executes radio wave propagation analysis processing based on the instructions and data inputted from the input device 102, and map information and radio system information stored in the memory of the information processing device 101, and displays the analysis results thereof on the display device 100.

Figure 3:
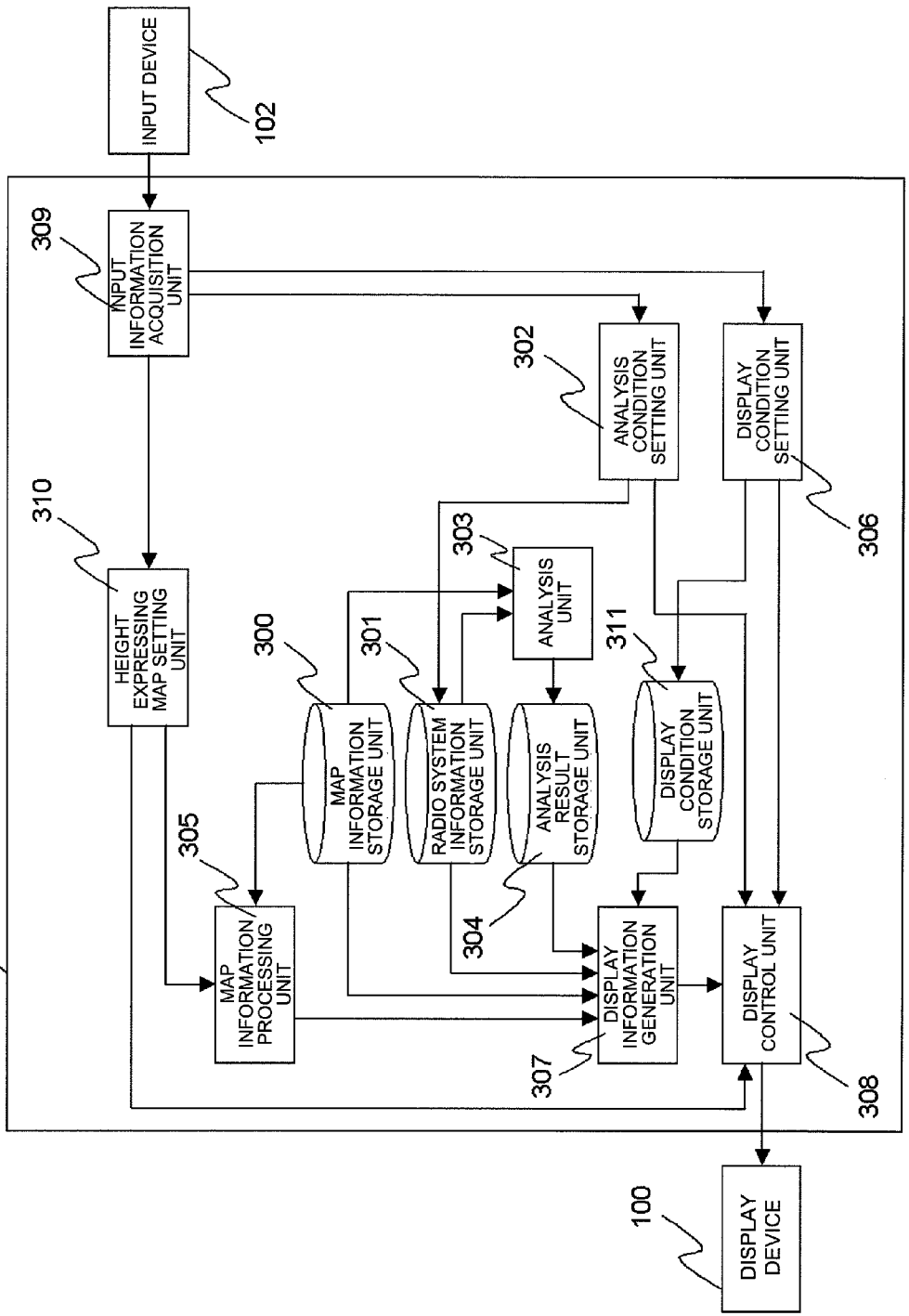
FIG. 3 is a function block diagram of an information processing device in the radio wave propagation analysis result display system relating to a first exemplary embodiment.

With reference to FIG. 3, the information processing device 101 comprises four memory units: a map information storage unit 300, a radio system information storage unit 301, an analysis result storage unit 304, and a display condition storage unit 311, and eight function units: an analysis condition setting unit 302, an analysis unit 303, a map information processing unit 305, a display condition setting unit 306, a display information generation unit 307, a display control unit 308, an input information acquisition unit 309, and a height expressing map setting unit 310. Each of the memory units above can be realized by the primary storage and the secondary storage of the computer constituting the information processing device 101. Further, each of the function units can be realized by a program. The program is stored on a magnetic disk and read by the computer constituting the information processing device 101. By controlling the operation of this computer, the function units above are realized thereon.

The map information storage unit 300 stores two-dimensional map information and three-dimensional map information of the region on which the radio wave propagation analysis is performed. Each of the map information includes the location information of rivers, roads and buildings and attribute information such as the number of stories in each building. In addition to these, the three-dimensional map information includes altitude information.

Figure 4:
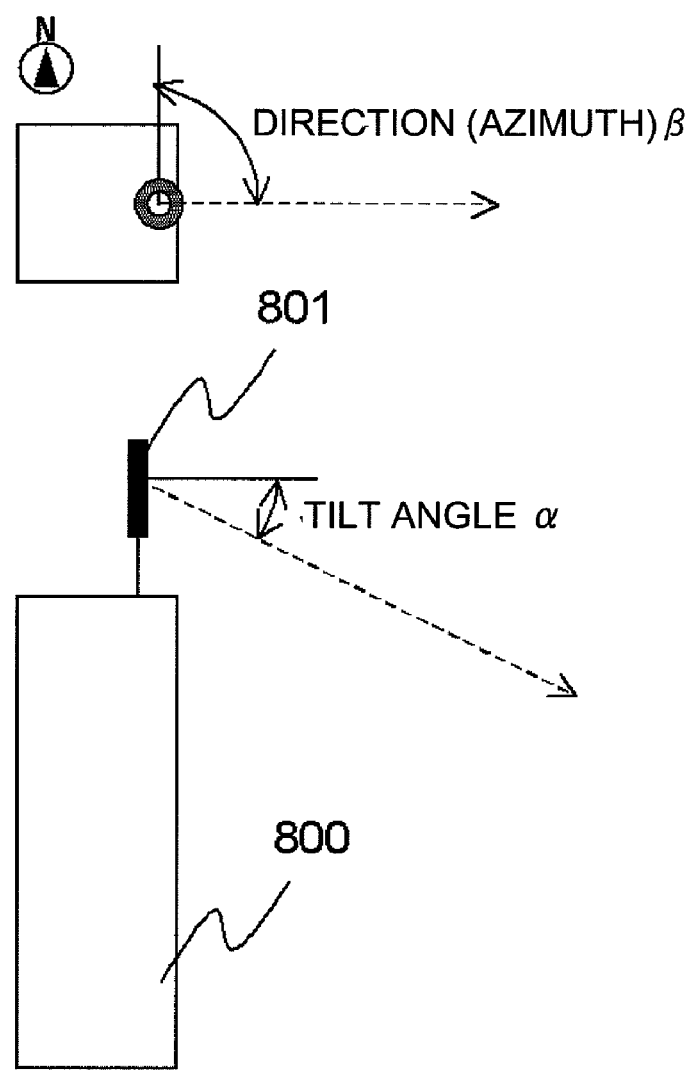
FIG. 4 is a drawing for explaining the direction (azimuth) and the tilt angle of an antenna.

The radio system information storage unit 301 stores information on the radio system on which the radio wave propagation analysis is performed. More concretely, the radio system information storage unit 301 stores the radio system information required for the radio wave propagation analysis such as the location information of radio base stations, the number of sectors, antenna types, antenna characteristics, the direction (azimuth) of the antennas (the horizontal angle), the tilt angle of the antennas (the vertical angle), and the transmission power. In general, a radio base station has at least one antenna. A radio base station having two or more antennas divides the region covered by the base station into sectors by using directional antennas. In this case, the range covered by each antenna is called "cell." Further, when an antenna 801 is set up on a building 800, as shown in FIG. 4, the antenna tilt angle is the radiation angle of a radio wave with the horizontal direction as a reference axis and the antenna direction is the radiation angle of a radio wave with north as a reference axis.

The analysis condition setting unit 302 adds new radio system information to the radio system information storage unit 301, deletes stored radio system information, and changes stored radio system information. More concretely, the analysis condition setting unit 302 generates setting change screen data of radio system information, displays the data on the display device 100 via the display control unit 308, receives radio system information inputted through the input device 102 in response to the setting change screen from the input information acquisition unit 309, and updates the radio system information storage unit 301.

Figure 5:
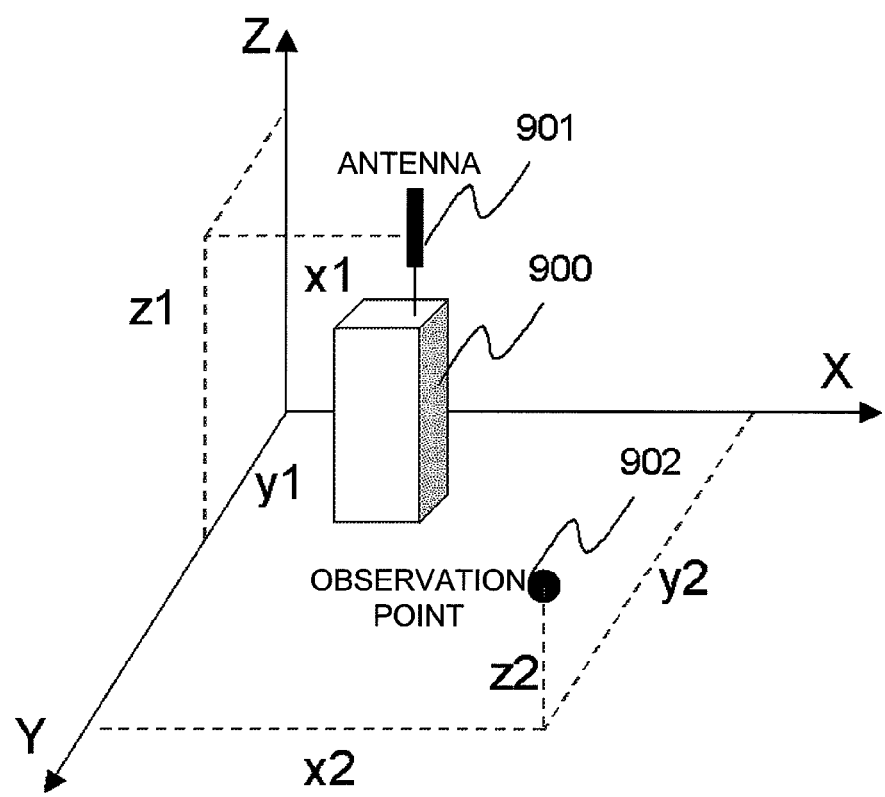
FIG. 5 is a drawing for explaining the location relation between a base station and an observation point.

The analysis unit 303 executes radio wave propagation analysis based on the map information stored in the map information storage unit 300 and the radio system information stored in the radio system information storage unit 301. In other words, for instance, the map information specifies the placement status of a building 900, as simplified and shown in FIG. 5, and the radio system information specifies the location and the characteristics of an antenna 901. Therefore, the analysis unit 303 is able to derive a predetermined analysis result such as the electric field intensity at an observation point 902 based on the distance between the antenna 901 and the observation point 902 and the status of buildings that exist between them. The radio wave propagation analysis method used may be a computer simulation method using the ray launching method described in the prior art, or calculations based on a statistical model, or a combination of these methods. When there is a plurality of antennas, the electric field intensity from each antenna is calculated. A plurality of the observation points 902 are set up in a grid in a three-dimensional space, the electric field intensities of the observation points 902 not located inside the building 900 out of the plurality of observation points 902 are derived using the radio wave propagation analysis described above, and the electric field intensity inside the building 900 is derived from the electric field intensities outside the building and a transmission loss caused by an external wall of the building.

The analysis result storage unit 304 comprises a storage device such as a magnetic disk that stores the analysis results of the analysis unit 303.

The height expressing map setting unit 310 lets a user select a type of map that he actually uses from a plurality of types of maps set in advance as maps expressing the height direction of a building. As the maps expressing the height direction of a building, there are three types: a vertical cross-section of the building, a three-dimensional map that includes an external view of the building, and a map that includes a wire frame with floors representing the building. The height expressing map setting unit 310 generates height expressing map selection screen data, displays the data on the display device 100 via the display control unit 308, receives selection information inputted through the input device 102 in response to the displayed height expressing map selection screen from the input information acquisition unit 309, and transmits the type of the height expressing map specified by the selection information to the map information processing unit 305.

From the map information stored in the map information storage unit 300, the map information processing unit 305 generates height expressing map data of the type transmitted from the height expressing map setting unit 310, and transmits the data to the display information generation unit 307.

The display condition setting unit 306 lets a user select display conditions for displaying the analysis results stored in the analysis result storage unit 304 on the display device 100. More concretely, the display condition setting unit 306 generates display condition setting screen data, displays the data on the display device 100 via the display control unit 308, receives display conditions inputted through the input device 102 in response to the displayed display condition setting screen from the input information acquisition unit 309, and stores the display conditions in the display condition storage unit 311. Here, the display conditions include the value of a transmission loss caused by an external wall of a building, the processing method for displaying the analysis results, and designation of a display area.

The display condition storage unit 311 comprises a storage unit such as a magnetic disk that stores the display conditions set by the display condition setting unit 306.

The input information acquisition unit 309 transmits data inputted from the input device 102 to a relevant unit out of the height expressing map setting unit 310, the analysis condition setting unit 302, and the display condition setting unit 306 according to the type of the data.

The display information generation unit 307 receives data from the map information storage unit 300, the radio system information storage unit 301, the analysis result storage unit 304, and the map information procesing unit 305, and generates the analysis result screen data displayed on the display device 100. More concretely, the display information generation unit 307 generates screen data for displaying an image, in which the analysis results received from the analysis result storage unit 304 are superimposed on the two-dimensional map received from the map information storage unit 300, in the display region A201 shown in FIG. 2. Further, the display information generation unit 307 generates screen data for displaying an image, in which the results of the analysis on a building interior derived from the analysis results received from the analysis result storage unit 304 and a transmission loss stored in the display condition storage unit 311 are superimposed on a map capable of expressing the height received from the map information processing unit 305, in the display region B202 shown in FIG. 2. Further, images of the radio base stations are displayed on the two-dimensional map and the map capable of expressing the height displayed in the display regions A201 and B202, being superimposed on places indicated by the locations of the radio base stations received from the radio system information storage unit 301.

The display control unit 308 outputs the analysis result screen data generated by the display information generation unit 307, the height expressing map selection screen data generated by the height expressing map setting unit 310, analysis condition setting screen data generated by the analysis condition setting unit 302, and the display condition setting screen data generated by the display condition setting unit 306 to the display device 100 as drawing data.

(Explanation of Operation)

Next, the entire operation of the present exemplary embodiment will be described with reference to a flowchart in FIG. 6.

Figure 7:
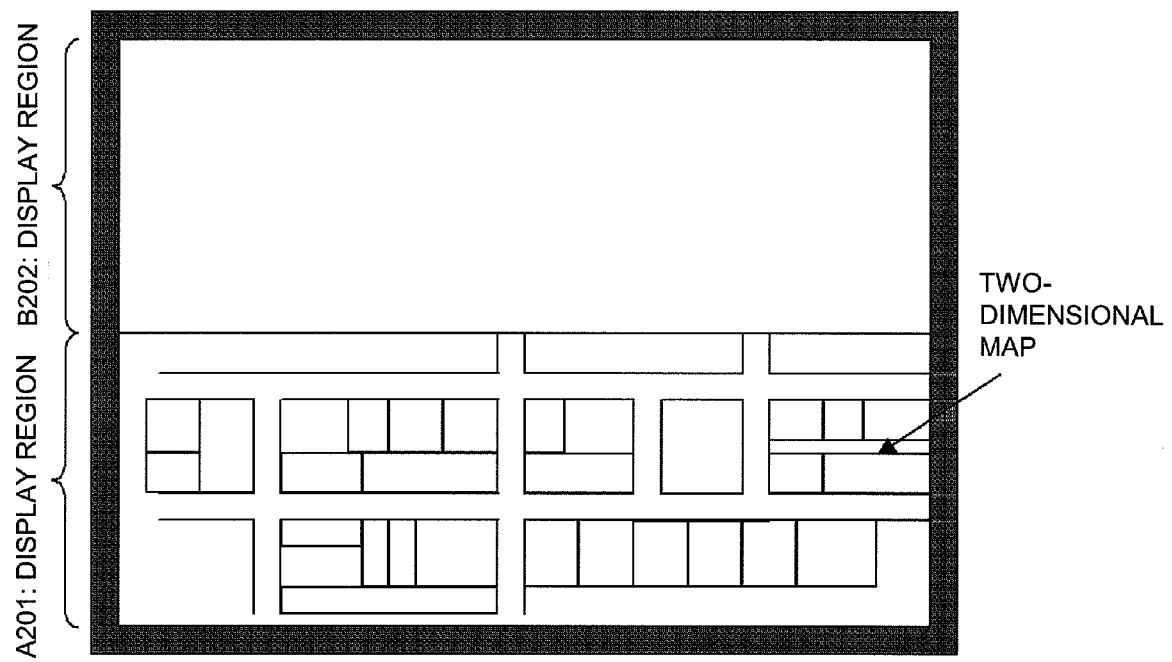
FIG. 7 is a drawing showing a display example of a display device in a radio wave propagation analysis result display system relating to a first exemplary embodiment.

When radio wave propagation analysis processing gets started by an instruction from the input device 102 (S400), the information processing device 101 has the display information generation unit 307 display a two-dimensional map that includes a radio wave propagation analysis region received from the map information storage unit 300 in the display region A201 of the display device 100 (S401). An example of the display screen at this time is shown in FIG. 7.

Figure 8:
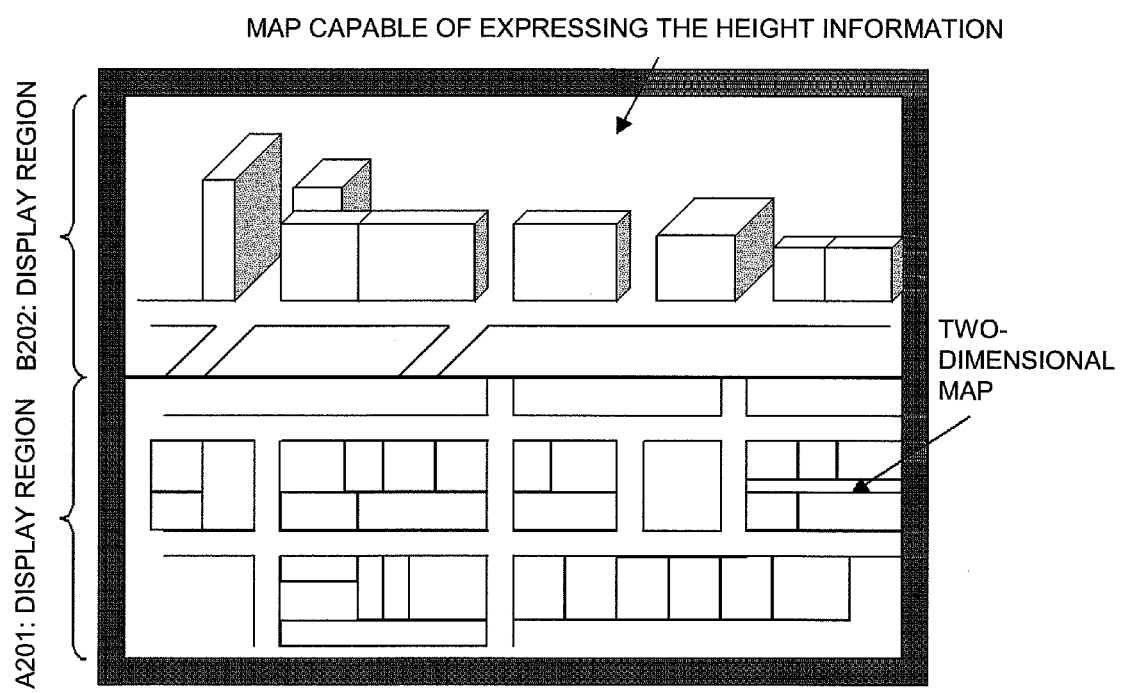
FIG. 8 is a drawing showing a display example of a display device in a radio wave propagation analysis result display system relating to a first exemplary embodiment.

Next, the height expressing map setting unit 310 displays the height expressing map selection screen on the display device 100 and accepts the selection of a height expressing map from a user (S402). Then the map information processing unit 305 generates a height expressing map of the type selected by the user, utilizing the three-dimensional map stored in the map information storage unit 300, and the display information generation unit 307 displays the map in the display region B202 of the display device 100 (S403). An example of the display screen at this time is shown in FIG. 8 (the display region A201 shows a two-dimensional map or plan, and the display region B202 shows an elevation or perspective diagram).

Figure 9:
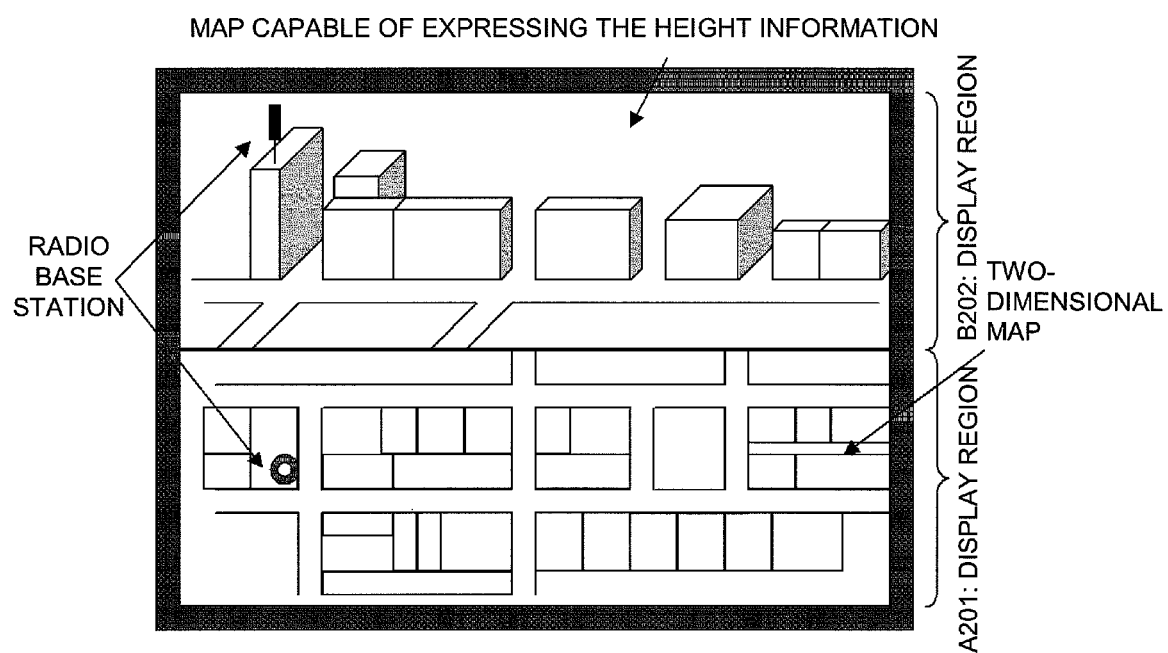
FIG. 9 is a drawing showing a display example of a display device in a radio wave propagation analysis result display system relating to a first exemplary embodiment.

Next, the analysis condition setting unit 302 displays the analysis condition setting screen on the display device 100 and receives conditions for the radio base station for performing the radio wave propagation analysis from the user (S404). The conditions that the user inputs include the location information of the radio base station, the number of sectors, the antenna type, antenna characteristics, the direction of the antenna, the tilt angle of the antenna, and the transmission power, and default values are stored in the radio system information storage unit 301. When it is necessary to add or delete a radio base station or to change the parameters of the radio base stations, the setting of the radio system information storage unit 301 can be changed through the analysis condition setting screen by operating the input device 102. FIG. 9 shows an example where a radio base station is added. The display information generation unit 307 displays marks indicating the radio base station in both the display region A201 (two-dimensional map or plan) and the display region B202 (three-dimensional elevation or perspective diagram) based on the location information of the radio base station added to the radio system information storage unit 301.

Next, the display condition setting unit 306 displays the display condition setting screen on the display device 100 and receives the display conditions for displaying the analysis results on the display device 100 from the user (S405).

Next, the analysis unit 303 executes the radio wave propagation analysis processing (S406). By this radio wave propagation analysis processing, the electric field intensity when a radio wave radiated from an antenna of the radio base station has reached an observation point is calculated as an analysis result, which is stored in the analysis result storage unit 304. Out of the plurality of observation points set up in a grid in a three-dimensional space, each of points not included inside a building is set as a observation point. When there is a plurality of antennas, the electric field intensity when a radio wave from each antenna has reached the same observation point is calculated as an analysis result separately. The calculation method may be a computer simulation method using the ray launching method, or calculations based on a statistical model, or a combination of these methods.

Next, the display information generation unit 307 displays the analysis results superimposed on the maps in the display regions A201 and B202 (S407). More concretely, according to the levels of the electric field intensities at the observation points near the ground, the display information generation unit 307 displays small areas having the observation points in the center, in a color corresponding to the level, superimposed on the two-dimensional map in the display region A201. Further, according to the levels of the electric field intensities at the observation points distributed in the height direction, the display information generation unit 307 displays small areas having the observation points in the center, in a color corresponding to the level, superimposed on the map capable of expressing the height direction in the display region B202. Further, depending on the contents of the display condition setting, there are cases where the values of the analysis results are displayed as they are, and cases where the values of the analysis results are processed and the processed values are displayed.

Next, the information processing device 101 waits for input from the user (S408), and performs processing corresponding to the type of the input when there is input (S409). More concretely, the information processing device 101 ends the radio wave propagation analysis processing when the type of the input is an end instruction. Further, when the input is an instruction to change the display conditions, the information processing device 101 accepts the setting change for the display conditions through the display condition setting screen (S410), as in the step S405, and by executing the processing from the step S407 again, the information processing device 101 displays the analysis results in the display regions A201 and B202 according to the changed display conditions. Further, when the input is an instruction to change the analysis conditions, the information processing device 101 accepts the setting change for the analysis conditions through the analysis condition setting screen (S411), as in the step S404, and by executing the processing from the step S406 again, the information processing device 101 executes the radio wave propagation analysis processing according to the changed analysis conditions and displays the results in the display regions A201 and B202.

Next, using concrete examples, the present exemplary embodiment will be described more in detail.

First Example

In a first example, a case where the user selects a map including a vertical cross-section of a building as the map expressing the height direction of the building will be described.

Figure 6:
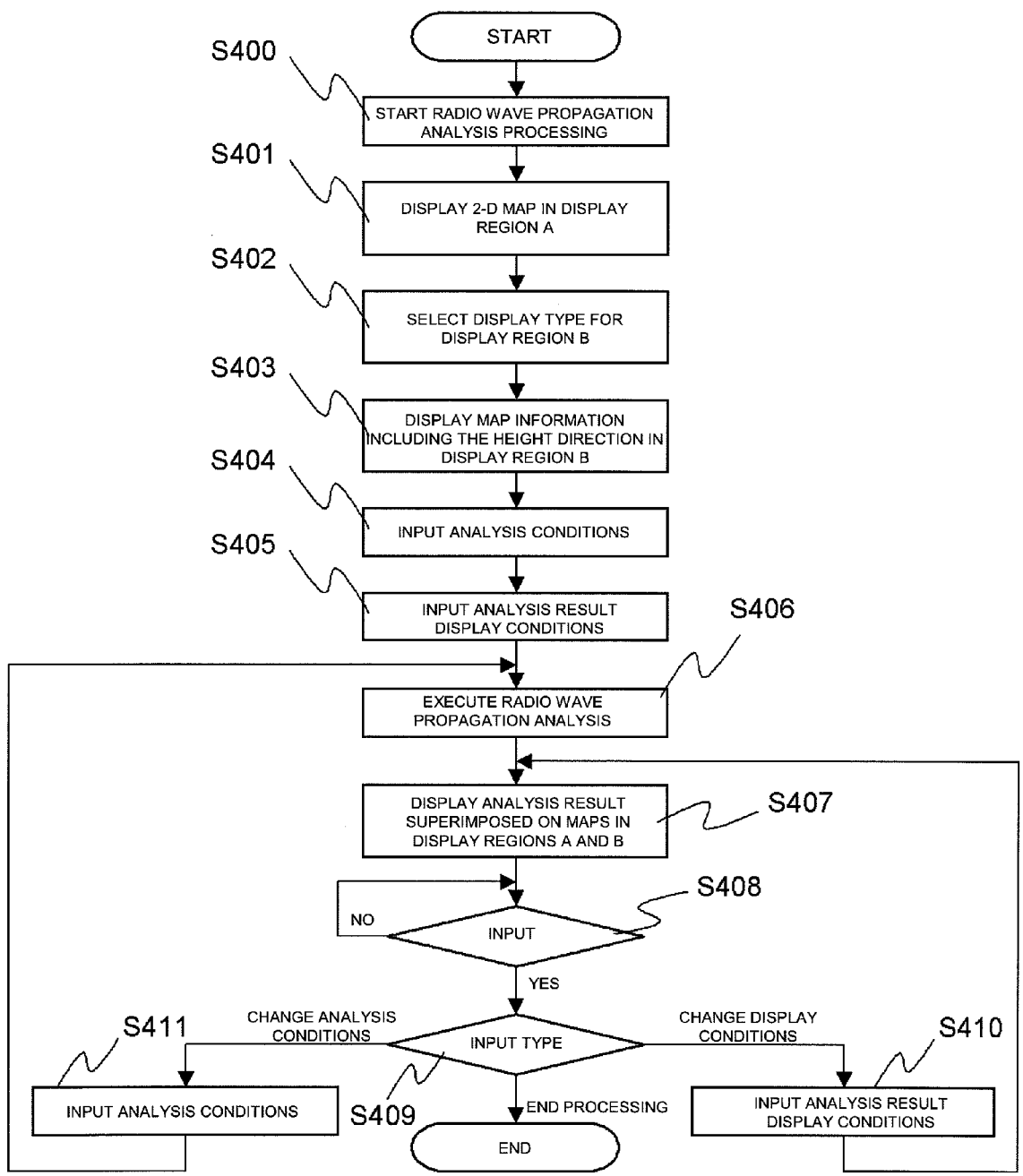
FIG. 6 is a flowchart showing an operation of a radio wave propagation analysis result display system relating to a first exemplary embodiment.
Figure 10:
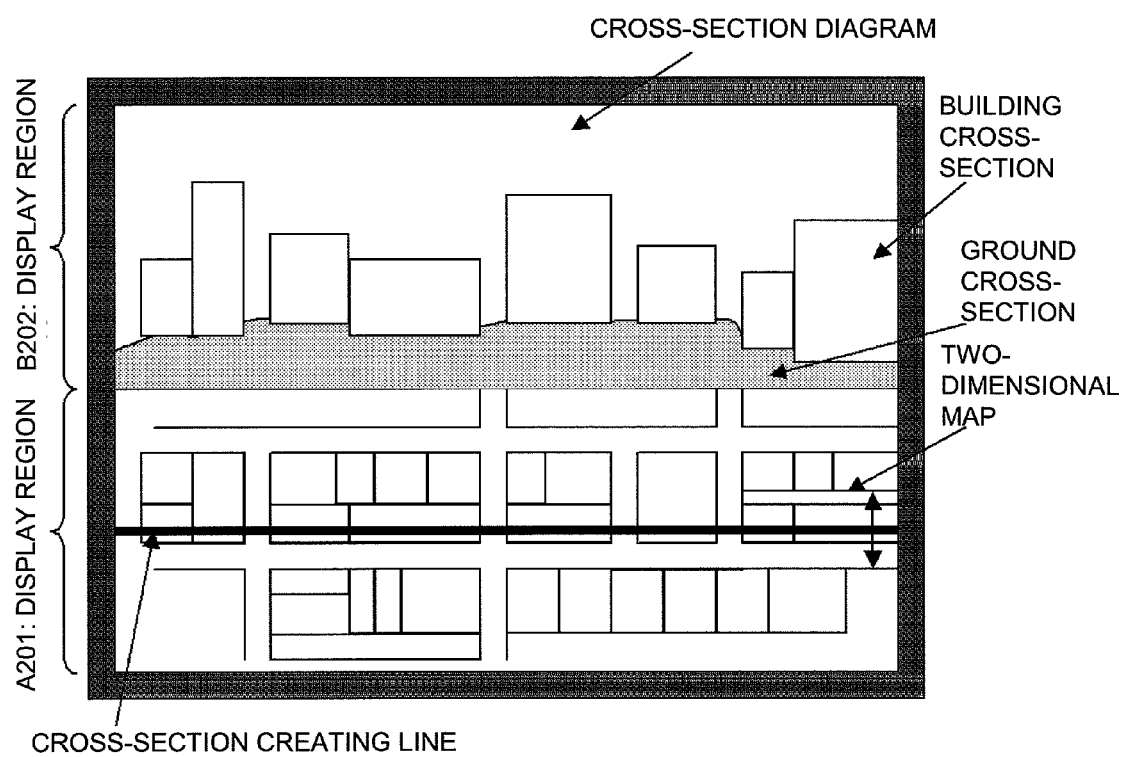
FIG. 10 is a drawing showing a display example of a display device in a radio wave propagation analysis result display system relating to a first example.

When the user selects the map including a vertical cross-section of a building (or an elevation or cubic diagram) as the map displayed in the display region B202 in the step S402 in FIG. 6, in the display region B202 as shown in FIG. 10, the map information processing unit 305 creates a cross-section diagram (or an elevation or cubic diagram viewed from a predetermined section) along a cross-section creating line on the two-dimensional map (or plan) in the display region A201, and the display information generation unit 307 displays the cross-section. Initially, the cross-section creating line is drawn in the vertical center of the display region A201, and the location and the shape of it can be changed in any way by operating the input device 102. When a change is made to the cross-section creating line, the cross-section diagram is changed accordingly.

Next, after the analysis condition setting unit 302 has received the analysis conditions such as addition of a radio base station (S404), the display condition setting unit 306 receives the display conditions for displaying the analysis results (S405). The display conditions at this time include specifying the display range and the value of a transmission loss when a radio wave transmits to the inside of a building. More concretely, the display range of the cross-section is classified into the ground, an area with a building, and space without any building, and the user specifies whether the analysis results are superimposed on both the space and the building, or the analysis results are superimposed only on either of those. Further, when a building is displayed and the analysis results refer to the outdoor electric field intensity, the user specifies the value of the transmission loss caused by the wall of the building in order to roughly estimate the indoor electric field intensity.

Next, the analysis unit 303 executes the radio wave propagation analysis (S406) and calculates the electric field intensity at each observation point. The path loss is calculated by means of a computer simulation method using the ray launching method or of calculations based on a statistical model, and the electric field intensity at each observation point is derived from the transmission power of the radio base station and the antenna characteristics.

Figure 11:
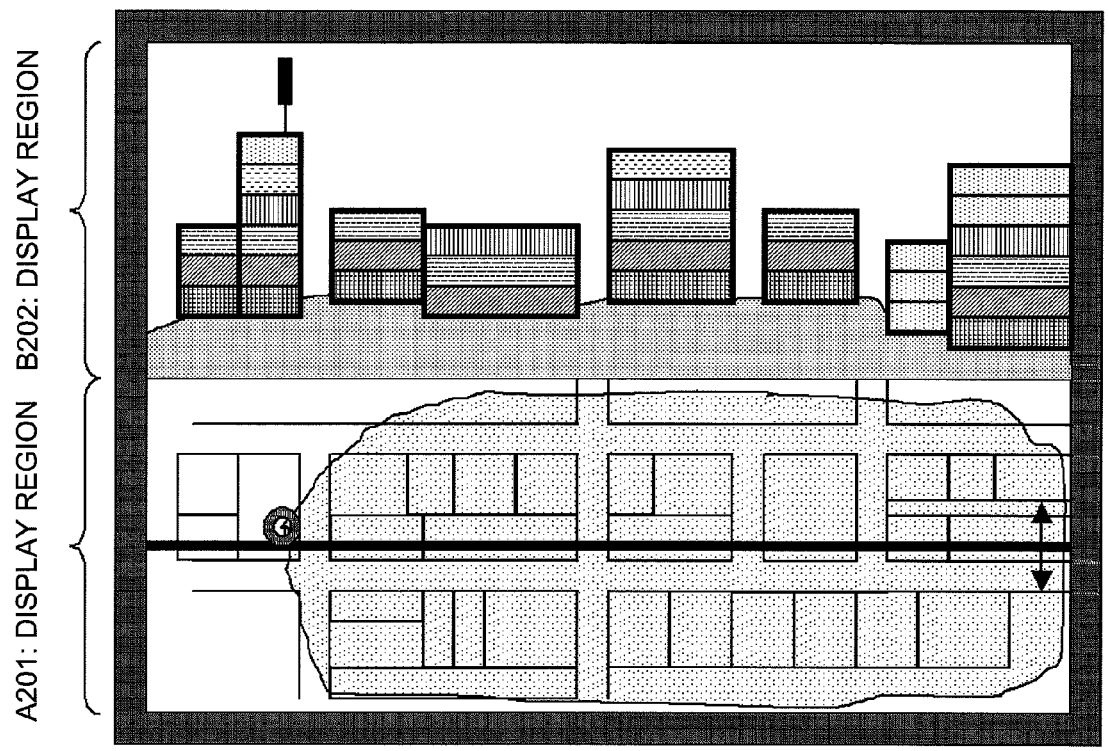
FIG. 11 is a drawing showing a display example of the display device in a radio wave propagation analysis result display system relating to a first example.

Next, the display information generation unit 307 displays the analysis results in the display regions A201 and B202 (S407) according to the inputted display conditions (S404). FIG. 11 shows an example in which the analysis results are displayed on the two-dimensional map in the display region A201 and on the cross-section diagram (or elevation) in the display region B202. The analysis results are displayed color-coded or pattern-coded according to the values of the analysis results.

Figure 12:
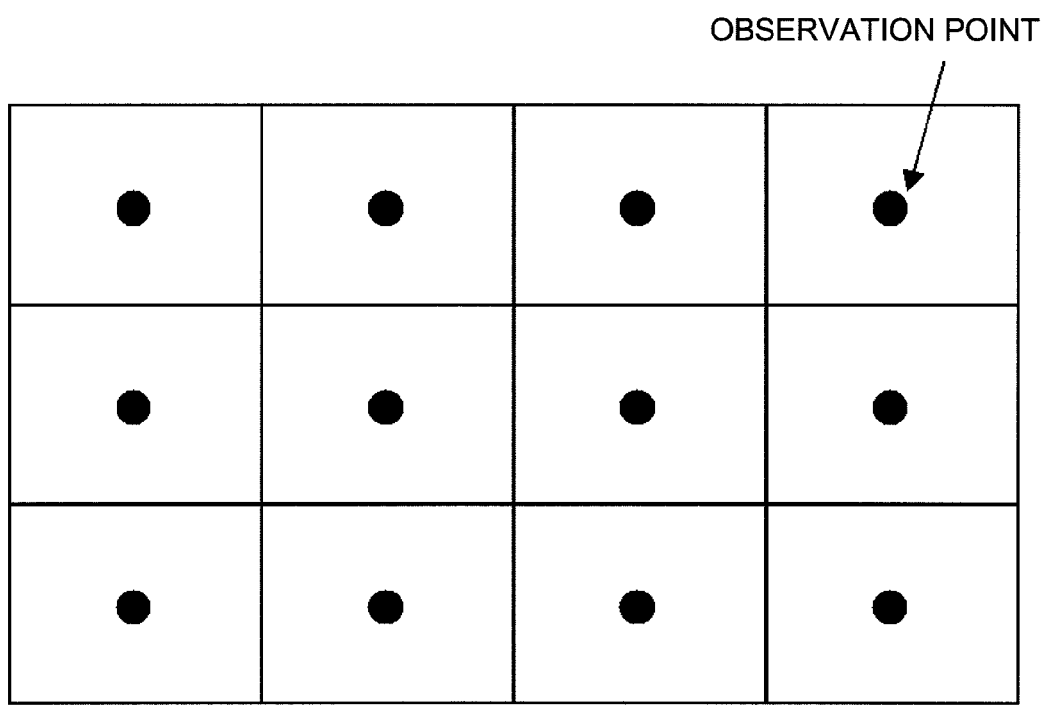
FIG. 12 is a drawing for explaining the relations between observation points and small regions including the observation points.

Here, regarding the display of the analysis results on the two-dimensional map, a small area having an observation point in the center is defined so that it is displayed as a two-dimensional representation, and this small area has the value of the result of the analysis on the observation point included in the area. More concretely, square areas having an observation point in the center are defined, as shown in FIG. 12. Further, regarding the display of the results of the analysis on the outside of a building (i.e., space) on the three-dimensional map, a cuboid having an observation point in the center is created, and the cuboid has the value of the observation point in the center. The value is displayed color-coded or pattern-coded by referring to the value of the cuboid adjacent to the cross-section creating line.

Meanwhile, regarding the results of the analysis on a building, the display area is divided vertically for each floor, and the results are displayed for each floor color-coded or pattern-code according to the values of the analysis results. Here, with reference to FIG. 13, the method for deriving the results of the radio wave propagation analysis on the inside of a building from the analysis results of the observation points outside the building will be described.

Figure 13:
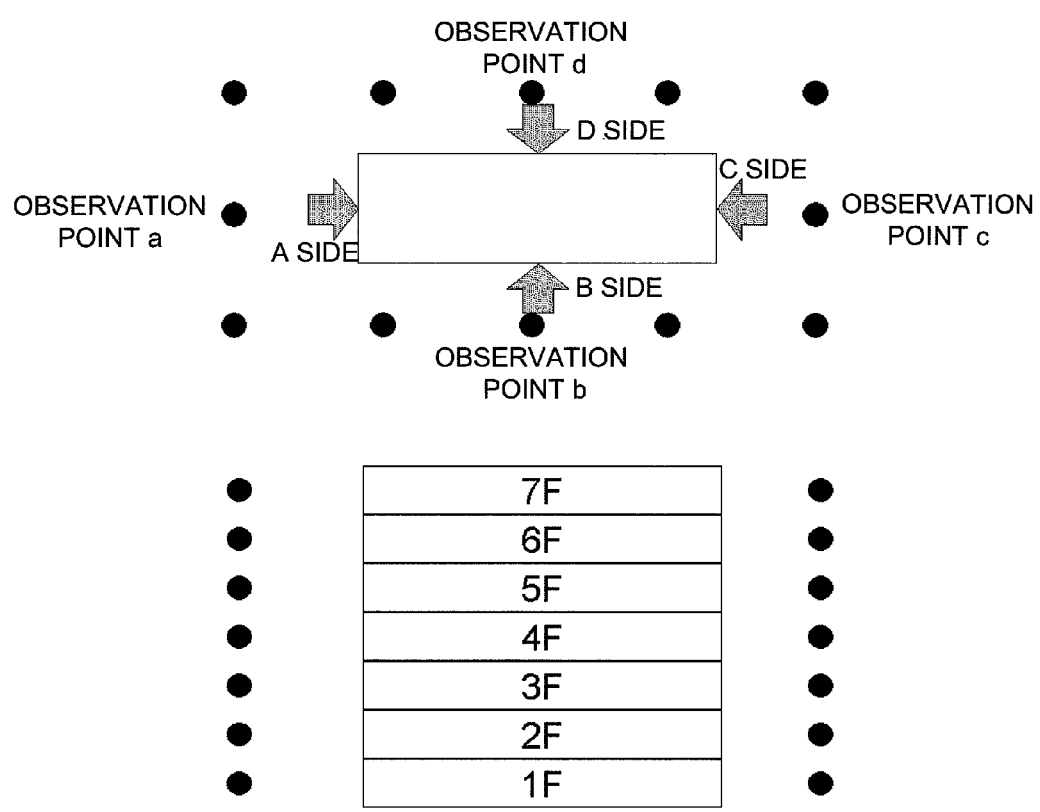
FIG. 13 is a drawing for explaining the relations between a building and observation points near it.

In FIG. 13, the upper drawing shows the building viewed from the top, the lower drawing shows the building viewed from a side, and there are the observation points (black circles in the drawings) around the building. Since each observation point around the building has a different analysis result, the average value of the analysis results of the observation points around the building is used as the result of the analysis on the entire cross-section of the building. For instance, the building has four sides: A, B, C, and D, and the result of an analysis on the entire fifth floor of the cross-section diagram is obtained by weighting the values of the observation points closest to the centers of sides A, B, C, and D of the fifth floor with the horizontal length of each side and averaging the resultant values. In other words, when the values of the analysis results of the observation points a, b, c, and d closest to sides A, B, C, and D of the fifth floor are Va, Vb, Vc, and Vd respectively, and the side lengths of sides A, B, C, and D are Xa, Xb, Xc, and Xd respectively, the result of the analysis on the entire fifth floor of the cross-section diagram can be given by the following expression.

$$V=(Va\times Xa+Vb\times Xb+Vc\times Xc+Vd\times Xd)/(Xa+Xb+Xc+Xd) \quad (1)$$

Next, the transmission loss caused by an external wall of the building is subtracted from the value V calculated above. The subtraction result is used as an approximation of an analysis result of radio wave propagation inside the building and the result is displayed color-coded or pattern-coded according to the value. Further, strictly speaking, the transmission loss value depends on the building, however, the same value may be used for all the sides for approximation, or different values may be set for each side or each divided small region. In this case, the transmission loss values of all the sides are averaged and the resultant value is subtracted from the value V calculated above.

In this example, each side has one observation point, however, each side may be divided into a plurality of areas, employing a plurality of observation points, and the values may be averaged.

Figure 14:
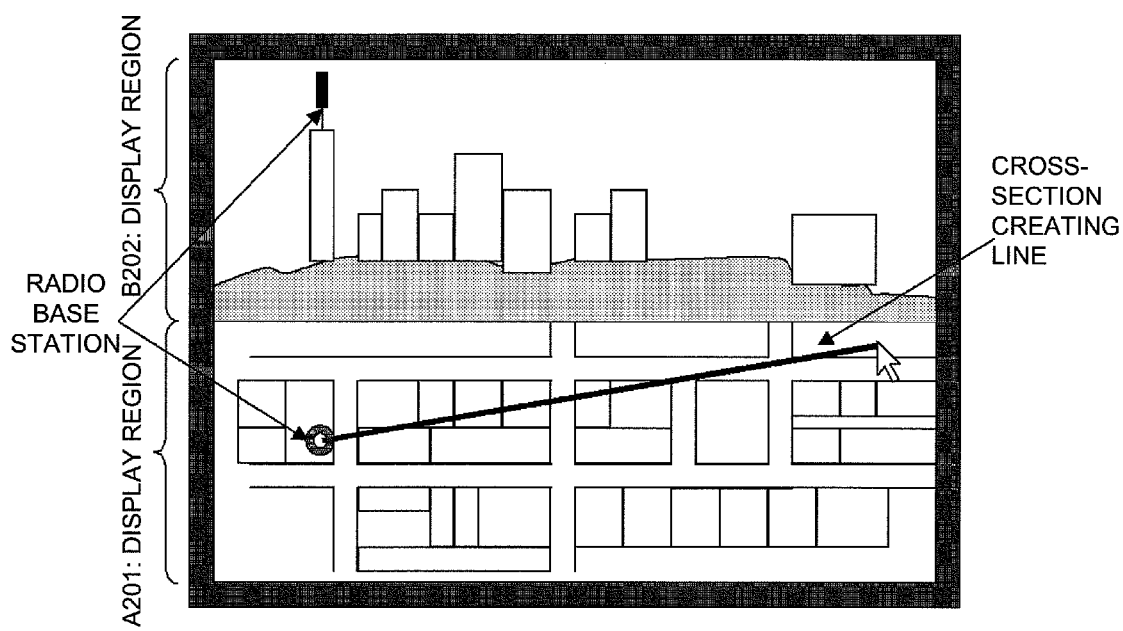
FIG. 14 is a drawing for explaining another example of a cross-section creating line in a radio wave propagation analysis result display system relating to a first example.
Figure 15:
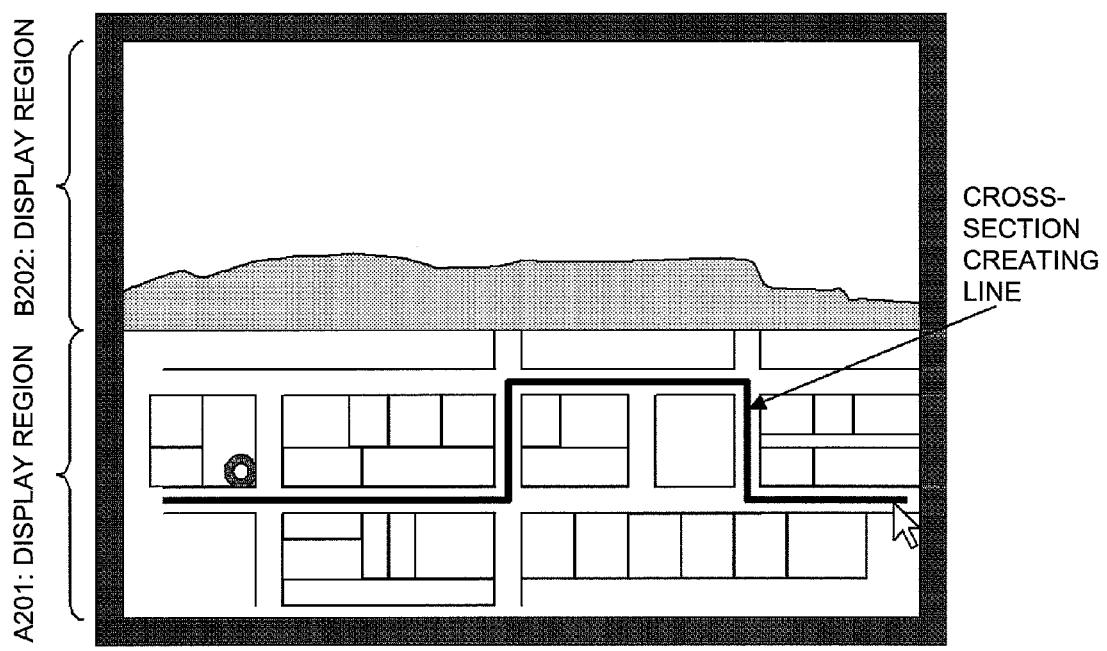
FIG. 15 is a drawing for explaining another example of a cross-section creating line in the radio wave propagation analysis result display system relating to a first example.

Next, when a change is made to the display conditions such as moving the cross-section creating line (S410), the analysis results are drawn on the two-dimensional map and the cross-section diagram according to the changed display conditions (S407). Here, the angle and the length of the cross-section creating line may be specified with the radio base station as a reference point as shown in FIG. 14, or the cross-section creating line may be specified as a broken line having at least one broken point at any location, creating a cross-section along, for instance, a road or railroad, as shown in FIG. 15.

Further, when a change is made to the analysis conditions such as changing the antenna tilt angle of the radio base station (S411), the analysis corresponding to the changed analysis conditions is performed (S406), and the analysis results are drawn on the two-dimensional map and the cross-section diagram based on the analysis results (S407).

According to this first example, the following effects are obtained.

By subtracting the value of the transmission loss caused by a wall of a building from the value of an analysis result of radio wave propagation outside the building, an analysis result of the inside of the building can be easily obtained.

Since the analysis result of the inside of the building is derived using the value obtained by averaging the analysis results of the radio wave propagation around the building, the analysis result of the radio wave propagation inside the building can be obtained while taking the analysis results of the radio wave propagation to all the sides of the building into consideration.

By displaying the result of the radio wave propagation analysis in space on the maps, it becomes possible to determine whether or not communication with a terminal inside an aircraft is possible.

Second Example

In a second example, a case where the user selects a three-dimensional map as the map expressing the height direction of the building will be described.

Figure 16:
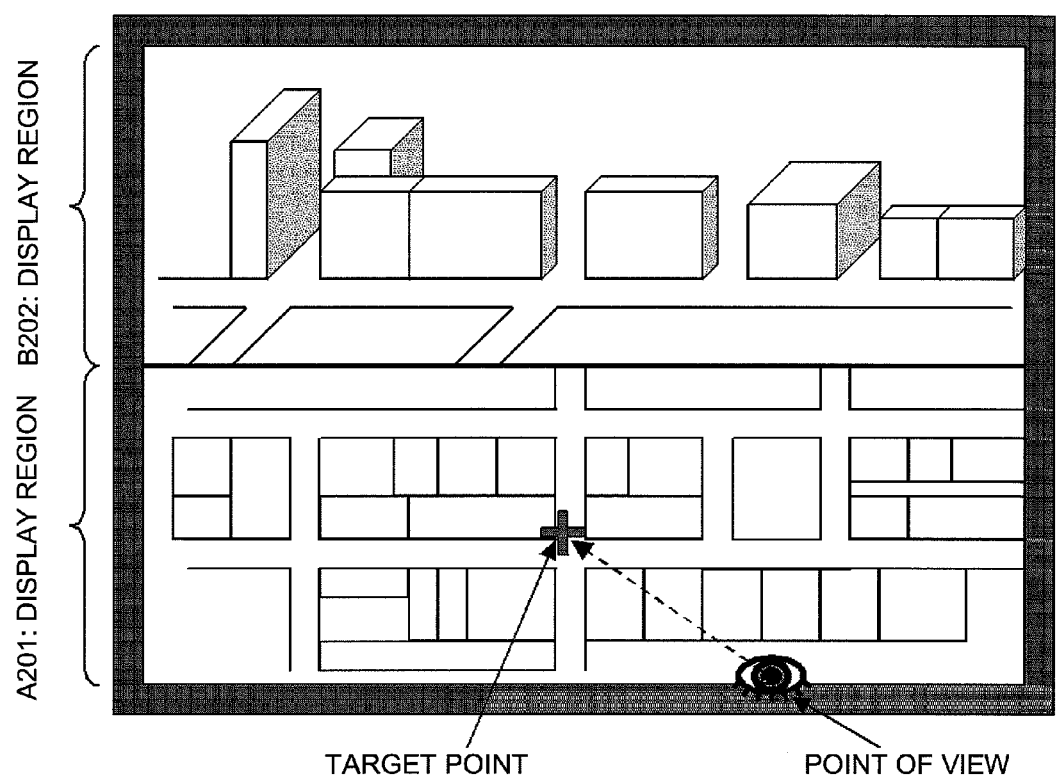
FIG. 16 is a drawing showing a display example of a display device in a radio wave propagation analysis result display system relating to a second example.

When the user selects the three-dimensional map as the map displayed in the display region B202 in the step S402 in FIG. 6 and specifies a point of view (the eye mark) and a point of regard (the cross mark) on the two-dimensional map, as shown in the display region A201 in FIG. 16, the map information processing unit 305 creates a three-dimensional map showing the point of regard viewed from the point of view, and the display information generation unit 307 displays the map in the display region B202, as shown in FIG. 16. The height of the point of view and the point of regard may be set in advance, or set by the user.

Next, after the analysis condition setting unit 302 has received the analysis conditions such as addition of a radio base station (S404), the display condition setting unit 306 receives the display conditions for displaying the analysis results (S405). The display conditions at this time specify whether the analysis result displayed on a wall surface of a building is the analysis result on the outside of the building near the wall surface or on the inside of the building, the value of the transmission loss used when the analysis result on the inside of a building is displayed, and whether or not the analysis results are displayed on the ground surface.

Next, the analysis unit 303 executes the radio wave propagation analysis (S406) and calculates the electric field intensity at each observation point. Then the display information generation unit 307 displays the analysis results in the display regions A201 and B201 according to the inputted display conditions (S407). The display of the results on the two-dimensional map in the display region A201 is the same as in the first example. Regarding the display of the results on the three-dimensional map in the display region B202, the display of the results on the ground surface is the same as in the display on the two-dimensional map.

Figure 17:
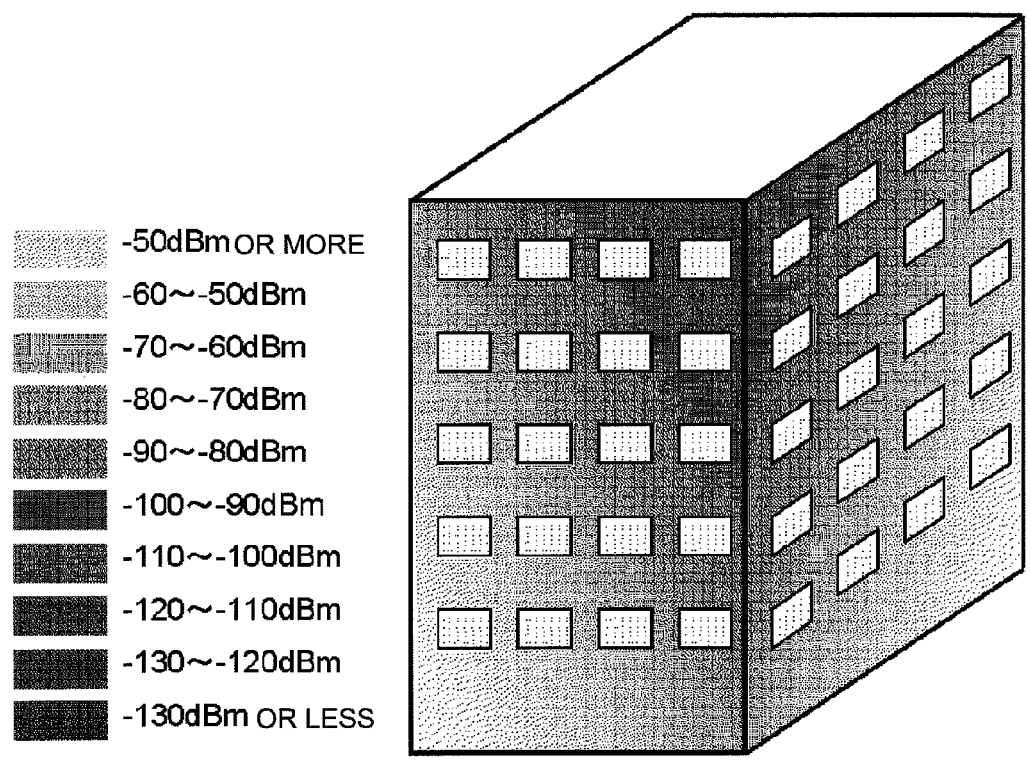
FIG. 17 is a drawing showing a display example of a display device in the radio wave propagation analysis result display system relating to a second example.

Meanwhile, when the user specifies that the analysis results on the outside of a building be displayed on the walls of the building in the analysis result display conditions, the display information generation unit 307 displays window textures on the building as shown in FIG. 17 and displays the analysis results superimposed thereon. Further, as for color-coded or pattern-coded display on the building wall surfaces according to the analysis results, the building wall surfaces are divided into a grid, and the value of the analysis result of the observation point closest to the center of each cell is referred to as the value of the particular building wall surface.

Figure 18:
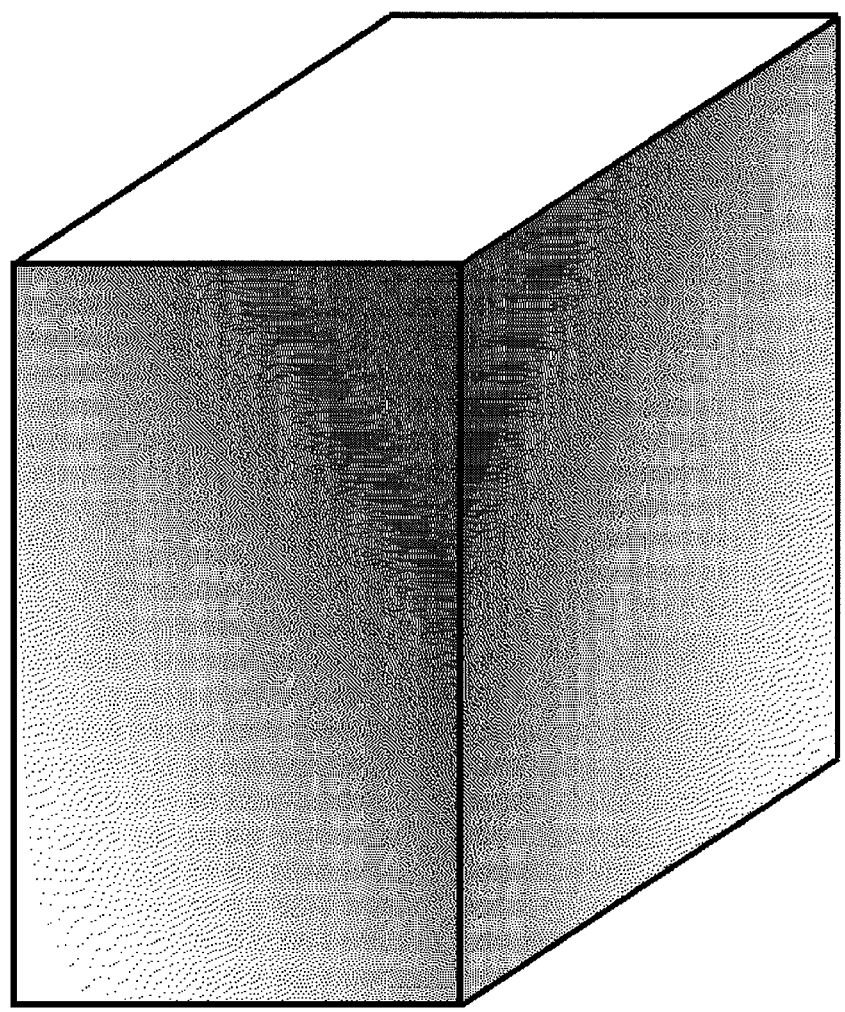
FIG. 18 is a drawing showing a display example of a display device in the radio wave propagation analysis result display system relating to a second example.

Further, when the user specifies that the analysis results on the inside of a building be displayed on the walls of the building in the analysis result display conditions, the display information generation unit 307 subtracts the value of the transmission loss caused by the wall of the building from the analysis results and displays the color-coded or pattern-coded results on the wall surfaces of the building (S407). More concretely, the building wall surfaces are divided into a grid and the display information generation unit 307 subtracts the transmission value from the analysis result of the observation point closest to the center of a cell for each cell in the grid. According to the resultant values, the grid on the wall surfaces are color-coded or pattern-coded. In the case where the user specifies that the analysis results on the inside of a building be displayed on the walls of the building, the window textures are not drawn on the building as shown in FIG. 18 so that the user can intuitively distinguish it from the case where the analysis results on the outside are displayed as in FIG. 17. Further, strictly speaking, the transmission loss value depends on the building, however, the same value may be used for all areas for approximation, or different values may be set for each divided small region.

Next, when the display conditions are changed (S410), the analysis results are drawn on the two-dimensional map and the three-dimensional map according to the changed display conditions (S407). Further, when a change is made to the analysis conditions such as changing the antenna tilt angle of the radio base station (S411), the analysis corresponding to the changed analysis conditions is performed (S406), and the analysis results are drawn on the two-dimensional map and the three-dimensional map based on the analysis results (S407).

According to this second example, the following effects can be obtained.

By subtracting the value of the transmission loss caused by a wall of a building from the value of an analysis result of radio wave propagation outside the building, an analysis result of the inside of the building can be easily obtained.

Since the analysis result of the inside of the building is derived by subtracting the transmission loss caused by the wall of the building from the radio wave propagation analysis result of the observation point outside the building and close to each external wall of the building or each small region of the external wall, an analysis result of radio wave propagation in an area inside the building and adjacent to the external wall of each side of the building can be obtained.

By determining whether or not window textures are displayed on a building, the user can intuitively recognize whether the radio wave propagation analysis results displayed on the walls of the building are the analysis results on the outside of the building or the analysis results on the inside of the building.

Third Example

In a third example, a case where the user selects a wire frame with floors as the map expressing the height direction of the building will be described.

Figure 19:
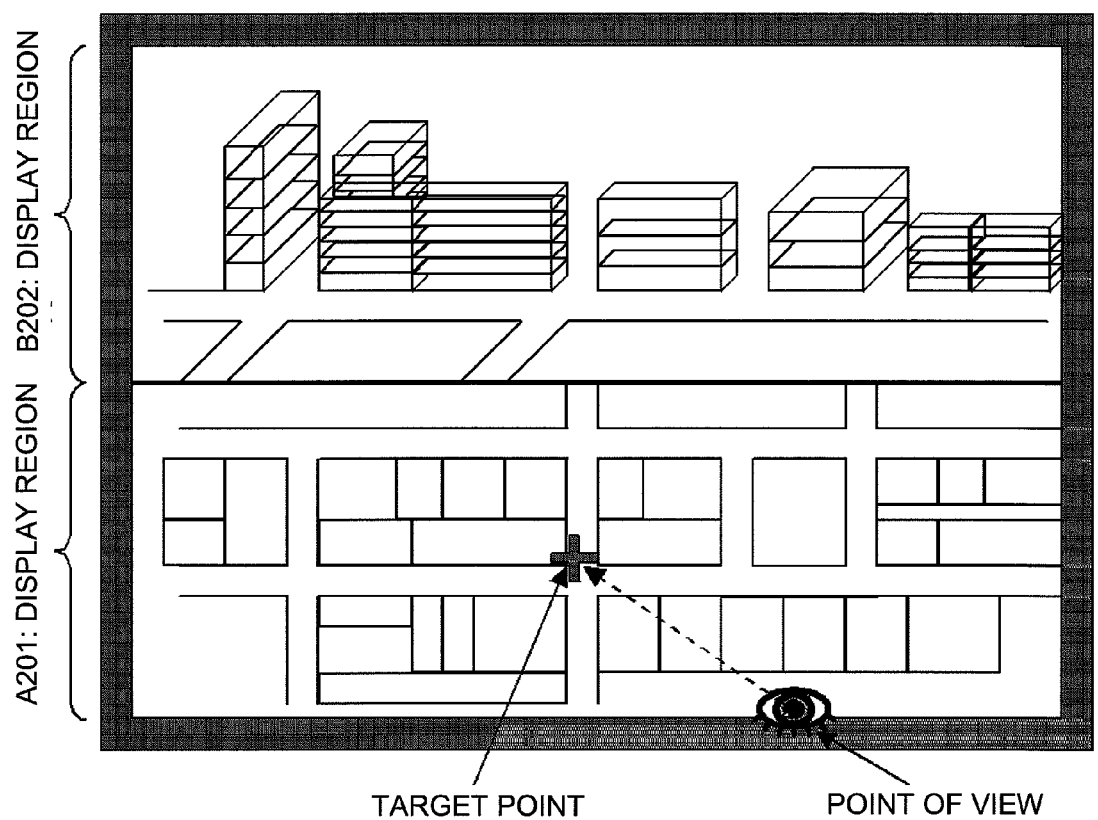
FIG. 19 is a drawing showing a display example of a display device in a radio wave propagation analysis result display system relating to a third example.

When the user selects the wire frame with floors as the map displayed in the display region B202 in the step S402 in FIG. 6 and specifies a point of view (the eye mark) and a point of regard (the cross mark) on the two-dimensional map as shown in the display region A201 in FIG. 19, the map information processing unit 305 creates a wire frame with floors showing the point of regard viewed from the point of view, and the display information generation unit 307 displays the wire frame in the display region B202, as shown in FIG. 19. The height of the point of view and the point of regard may be set in advance, or set by the user.

Next, after the analysis condition setting unit 302 has received the analysis conditions such as addition of a radio base station (S404), the display condition setting unit 306 receives the display conditions for displaying the analysis results (S405). The display conditions at this time specify the value of the transmission loss caused by a wall of a building, and whether or not the analysis results are displayed on the ground surface.

Figure 20:
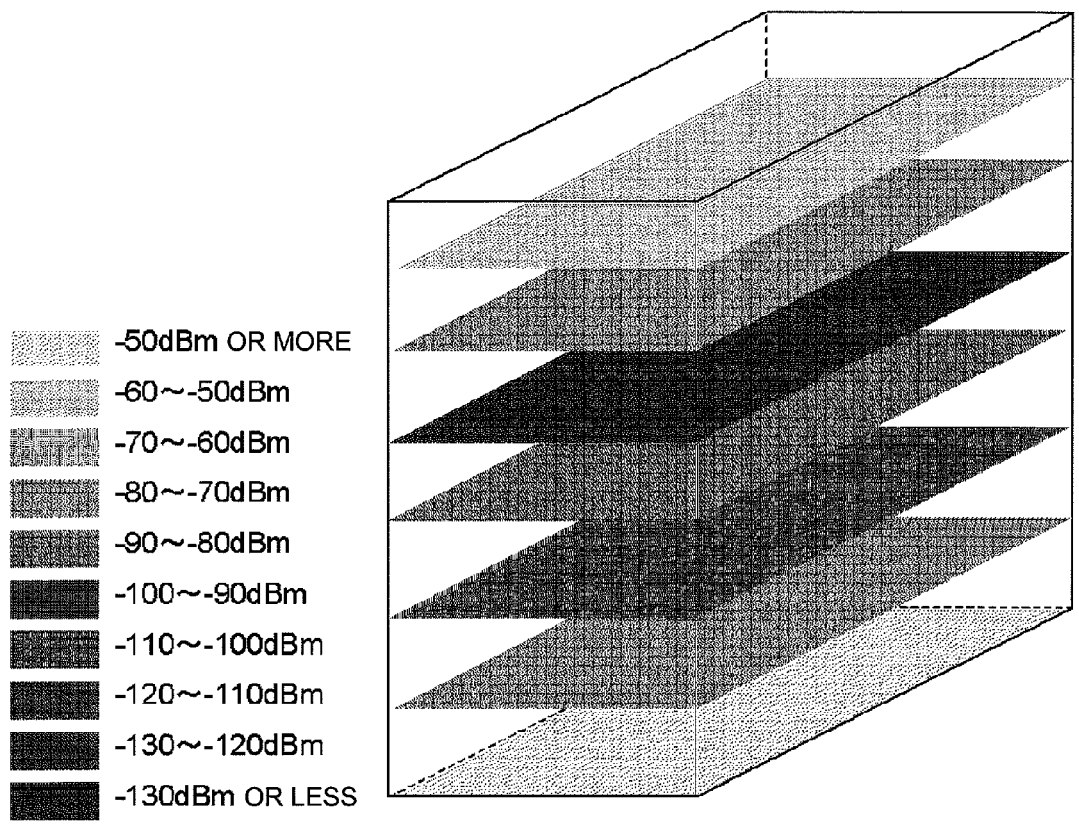
FIG. 20 is a drawing showing a display example of a display device in the radio wave propagation analysis result display system relating to a third example.

Next, the analysis unit 303 executes the radio wave propagation analysis (S406) and calculates the electric field intensity at each observation point. Then the display information generation unit 307 displays the analysis results in the display regions A201 and B201 according to the inputted display conditions (S407). The display of the results on the two-dimensional map is the same as in the first example. Regarding the display of the results on the wire frame with floors, the display of the results on the ground surface is the same as in the display on the two-dimensional map. Meanwhile, regarding the display of the results on the floors of a building, using the same method described in the first example, the averaged analysis result is calculated for each floor, and the analysis result on the inside of the building is calculated for each floor by subtracting the transmission loss from the calculated analysis result. According to the calculated values, the results are displayed color-coded or pattern-coded for each floor as shown in FIG. 20.

Next, when the display conditions are changed (S410), the analysis results are drawn on the two-dimensional map and the wire frame with floors according to the changed display conditions (S407). Further, when a change is made to the analysis conditions such as changing the antenna tilt angle of the radio base station (S411), the analysis corresponding to the changed analysis conditions is performed (S406), and the analysis results are drawn on the two-dimensional map and the wire frame with floors based on the analysis results (S407).

According to this third example, the following effects can be obtained.

By subtracting the value of the transmission loss caused by a wall of a building from the value of an analysis result of radio wave propagation outside the building, an analysis result of the inside of the building can be easily obtained.

Since the analysis result of the inside of the building is derived using the value obtained by averaging the analysis results of the radio wave propagation around the building, the analysis result of the radio wave propagation inside the building can be obtained while taking the analysis results of the radio wave propagation to all the sides of the building into consideration.

Fourth Example

In the first to third examples, the maps are color-coded or pattern-coded according to the electric field intensity. On the other hand, in a fourth example, the communication quality is determined by comparing the electric field intensity to a predetermined threshold value, and the maps are color-coded or pattern-coded according to the determined communication quality.

The display condition setting unit 306 receives an instruction as to whether or not the communication quality is displayed and a threshold value when the communication quality is displayed from the input device 102 through the display condition setting screen, and stores the information in the display condition storage unit 311. As for the threshold values, one or more threshold values such as a first threshold value giving a borderline between an electric field intensity that indicates a bad communication quality and an electric field intensity that indicates a normal communication quality, and a second threshold value giving a borderline between an electric field intensity that indicates a normal communication quality and an electric field intensity that indicates a good communication quality may be set. In this case, three categories are set according to the value of the electric field intensity: good, normal, and bad. Further, fixed values may be used as the threshold values instead of having the user specify them.

The display information generation unit 307 determines the communication quality for each part by comparing the electric field intensities, derived as in the first to third examples, of each small region on the two-dimensional map and the cross-section of the building, the external wall of the building, and the wire frame with floors on the map capable of expressing the height to the threshold value, and color-codes or pattern-codes the results according to the determined results.

According to this fourth example, when the user selects the map including a vertical cross-section of a building as the map capable of expressing the height, the following effects can be obtained.

By comparing the value obtained by subtracting the value of the transmission loss caused by a wall of a building from the value of an analysis result of radio wave propagation outside the building to the threshold value, the communication quality inside the building can easily obtained.

By comparing the value obtained by averaging the analysis results of the radio wave propagation around the building to the threshold value, the communication quality inside the building can be obtained while taking the analysis results of the radio wave propagation to all the sides of the building into consideration.

By displaying the result of comparison between the radio wave propagation analysis results and the threshold value in space on the maps, it becomes possible to determine the quality of communication with a terminal inside an aircraft.

According to this fourth example, when the user selects the three-dimensional map as the map capable of expressing the height, the following effects can be obtained.

By comparing the value obtained by subtracting the value of the transmission loss caused by a wall of a building from the value of an analysis result of radio wave propagation outside the building to the threshold value, the communication quality inside the building can easily obtained.

By deriving an analysis result of the inside of the building by subtracting the value of the transmission loss caused by the wall of the building from the radio wave propagation analysis result of the observation point outside the building and close to each external wall of the building or each small region of the external wall, and comparing the derived analysis result to the threshold value, the communication quality in an area inside the building and adjacent to the external wall of each side of the building can be obtained.

By determining whether or not window textures are displayed on a building, the user can intuitively recognize whether the communication quality displayed on the walls of the building relates to the outside of the building or the inside of the building.

Further, according to this fourth example, when the user selects the wire frame with floors as the map expressing the height direction, the following effects can be obtained.

By comparing the value obtained by subtracting the value of the transmission loss caused by a wall of a building from the value of an analysis result of radio wave propagation outside the building to the threshold value, the communication quality inside the building can easily obtained.

By comparing the value obtained by averaging the analysis results of the radio wave propagation around the building to the threshold value, the communication quality inside the building can be obtained while taking the analysis results of the radio wave propagation to all the sides of the building into consideration.

Fifth Example

In the first to third examples, the maps are color-coded or pattern-coded according to the electric field intensity. On the other hand, in a fifth example, the display information generation unit 307 calculates regions where a handover takes place, and the maps are color-coded or pattern-coded into handover regions and non-handover regions.

Figure 21:
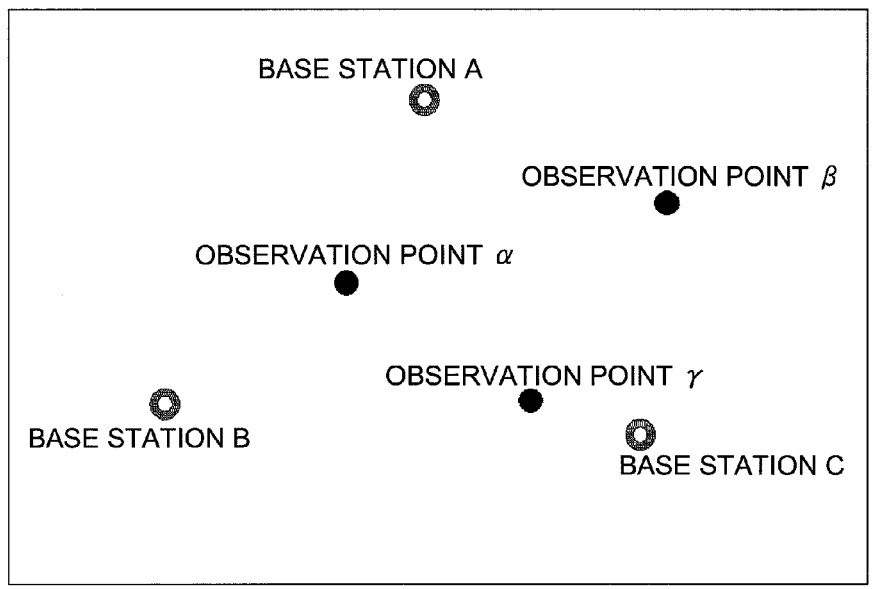
FIG. 21 is a drawing showing the relations between base stations and observation points in a radio wave propagation analysis result display system relating to a fifth example.
Figure 22:
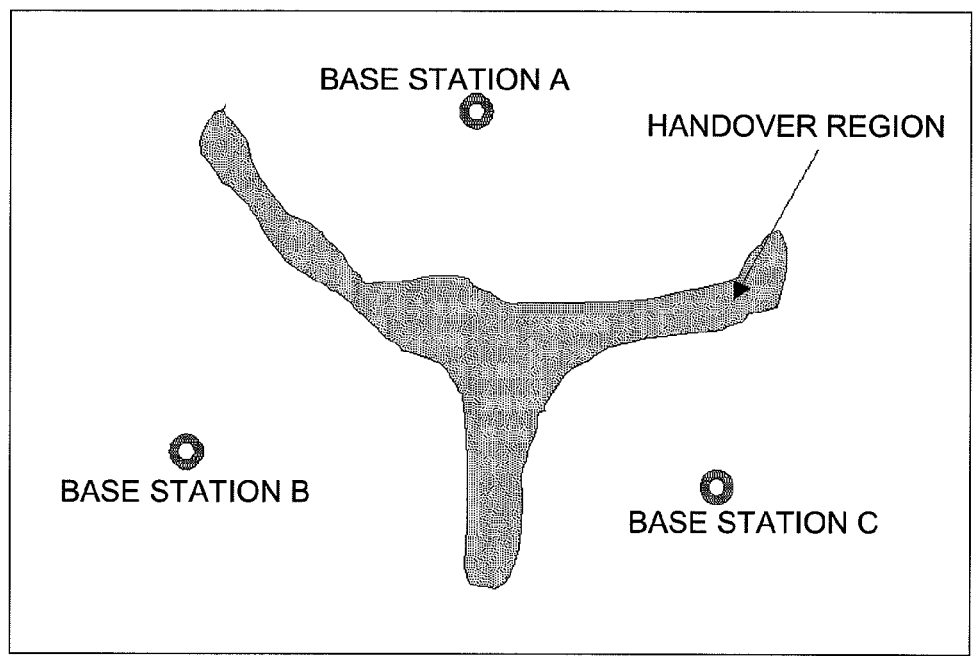
FIG. 22 is a drawing showing a display example of a display device in the radio wave propagation analysis result display system relating to a fifth example.

Whether or not an area (an observation point or the inside of a building) on the two-dimensional map and the three-dimensional map is included in a handover region is determined by calculating the Ec/No (the ratio of energy per desired wave chip to an in-band reception power density) in the area for each cell in the radio base station, and by checking whether or not there is any other cell having an Ec/No whose difference from the greatest Ec/No value is not greater than a predetermined constant value. For instance, when there are base stations A, B, and C and observation points α, β, and γ as shown in FIG. 21, the Ec/No at each observation point is calculated for each cell. Here, for the sake of simplicity, we will assume that each base station has a one-sector configuration. When an observation point has an Ec/No whose difference from the Ec/No having the greatest reception power is within a predetermined range, this observation point is deemed to be included in a handover region. For instance, at the observation point α, the Ec/No of the base stations A, B, and C are a1, b1, and c1 respectively. When c1 is the greatest, and the difference between c1 and a1 or b1, or the difference between c1 and the both are not greater than a predetermined constant value, the observation point α is deemed to be included in a handover region. Assuming that a small area having an observation point in the center has the value of the observation point included in this small area, each small area is color-coded or pattern-coded, as shown in FIG. 22.

Here, as "Ec" of the Ec/No at each observation point, for instance the electric field intensity from a desired cell can be used. Further, as "No," the electric field intensity from cells other than the desired cell can be used. The Ec/No inside a building can be calculated by subtracting the transmission loss from both Ec and No of the Ec/No used in the calculation for the outside of the building.

In the present example, the handover regions are displayed on the two-dimensional map, however, they can be displayed on the cross-section diagram of the first example, the three-dimensional map of the second example, and the wire frame with floors of the third example, and the following effects can be obtained respectively.

When the user selects the map including a vertical cross-section of a building as the map expressing the height direction of the building, the following effects can be obtained.

By deriving the Ec/No from the value obtained by subtracting the value of the transmission loss caused by a wall of a building from the value of an analysis result of radio wave propagation outside the building thereby determining whether or not the building is in a handover region, whether or not the inside of the building is in a handover region can be easily investigated.

By deriving the Ec/No inside the building by subtracting the value of the transmission loss from the value obtained by averaging the analysis results of the radio wave propagation around the building thereby determining whether or not the building is in a handover region, whether or not the inside of the building is in a handover region can be investigated while taking the analysis results of the radio wave propagation to all the sides of the building into consideration.

By deriving the Ec/No from the radio wave propagation analysis result thereby determining whether or not an area is in a handover region and displaying the result in space on the maps, it becomes possible to investigate handover regions in communication with a terminal inside an aircraft.

Next, when the user selects the three-dimensional map as the map expressing the height direction of the building, the following effects can be obtained.

By deriving the Ec/No from the value obtained by subtracting the value of the transmission loss caused by a wall of a building from the value of an analysis result of radio wave propagation outside the building thereby determining whether or not the building is in a handover region, whether or not the inside of the building is in a handover region can be easily investigated.

By deriving an analysis result of the inside of the building by subtracting the value of the transmission loss caused by the wall of the building from the radio wave propagation analysis result of the observation point outside the building and close to each external wall of the building or each small region of the external wall, and deriving the Ec/No from the derived analysis result thereby determining whether or not the building is in a handover region, whether or not an area inside the building and adjacent to the external wall of each side of the building is in a handover region can be investigated.

By determining whether or not window textures are displayed on a building, the user can intuitively recognize whether the handover region status results displayed on the walls of the building refer to the status outside the building or to the status inside the building.

Further, when the user selects the wire frame with floors as the map expressing the height direction of the building, the following effects can be obtained.

By deriving the Ec/No from the value obtained by subtracting the value of the transmission loss caused by a wall of a building from the value of an analysis result of radio wave propagation outside the building thereby determining whether or not the building is in a handover region, whether or not the inside of the building is in a handover region can be easily investigated.

By deriving the Ec/No from the value obtained by averaging the analysis results of the radio wave propagation around the building thereby determining whether or not the building is in a handover region, whether or not the inside of the building is in a handover region can be investigated while taking the analysis results of the radio wave propagation to all the sides of the building into consideration.

Sixth Example

In the first to third examples, the maps are color-coded or pattern-coded according to the electric field intensity. On the other hand, in a sixth example, the display information generation unit 307 color-codes or pattern-codes the maps according to the number of connectable radio base stations.

Figure 23:
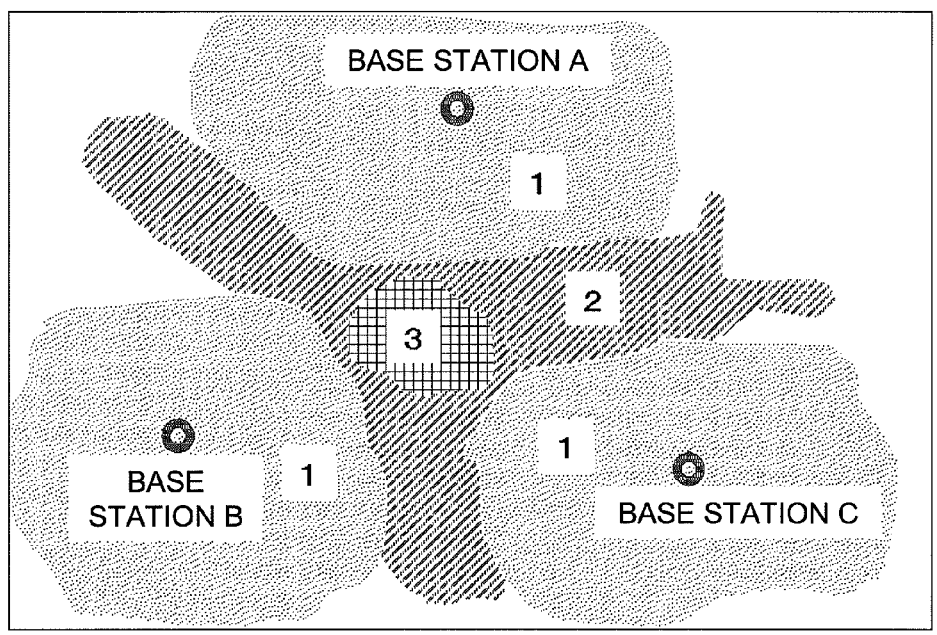
FIG. 23 is a drawing showing a display example of a display device in a radio wave propagation analysis result display system relating to a sixth example.

The number of connectable radio base stations in an area (an observation point or the inside of a building) on the two-dimensional map and the three-dimensional map can be calculated by calculating the Ec/No in the area from each radio base station and adding one to the number of other radio base stations having Ec/No whose differences from the greatest Ec/No value are not greater than a predetermined constant value respectively. For instance, in a case shown in FIG. 21, the Ec/No from the base station A has the largest value a2 at the observation point β, and when the differences between each Ec/No from the base stations B and C and a2 respectively are within a predetermined range, the number of connectable base stations are three. Assuming that a small area having an observation point in the center has the value of the observation point included in this small area, each small area is color-coded or pattern-coded, as shown in FIG. 23.

Here, as "Ec" of the Ec/No at each observation point, for instance the electric field intensity from a desired cell can be used, and the electric field intensity from cells other than the desired cell can be used as "No." The Ec/No inside a building can be calculated by subtracting the transmission loss from both Ec and No of the Ec/No used in the calculation for the outside of the building.

In the present example, the number of connectable radio base stations is displayed on the two-dimensional map, however, it can be displayed on the cross-section diagram of the first example, the three-dimensional map of the second example, and the wire frame with floors of the third example, and the following effects can be obtained respectively.

When the user selects the map including a vertical cross-section of a building as the map expressing the height direction of the building, the following effects can be obtained.

By deriving the Ec/No from the value obtained by subtracting the value of the transmission loss caused by a wall of a building from the value of an analysis result of radio wave propagation outside the building thereby determining the number of connectable radio base stations, the number of connectable radio base stations inside the building can be easily investigated.

By deriving the Ec/No inside the building by subtracting the value of the transmission loss from the value obtained by averaging the analysis results of the radio wave propagation around the building thereby determining the number of connectable radio base stations, the number of connectable radio base stations inside the building can be investigated while taking the analysis results of the radio wave propagation to all the sides of the building into consideration.

By deriving the Ec/No from the radio wave propagation analysis result thereby determining the number of connectable radio base stations, and displaying the result in space on the maps, it becomes possible to investigate the number of connectable radio base stations in communication with a terminal inside an aircraft.

Next, when the user selects the three-dimensional map as the map expressing the height direction of the building, the following effects can be obtained.

By deriving the Ec/No from the value obtained by subtracting the value of the transmission loss caused by a wall of a building from the value of an analysis result of radio wave propagation outside the building thereby determining the number of connectable radio base stations, the number of connectable radio base stations inside the building can be easily investigated.

By deriving an analysis result of the inside of the building by subtracting the value of the transmission loss caused by the wall of the building from the radio wave propagation analysis result of the observation point outside the building and close to each external wall of the building or each small region of the external wall, and deriving the Ec/No from the derived analysis result thereby determining the number of connectable radio base stations, the number of connectable radio base stations in an area inside the building and adjacent to the external wall of each side of the building can be investigated.

By determining whether or not window textures are displayed on a building, the user can intuitively recognize whether the number of connectable radio base stations displayed on the walls of the building refer to the status outside the building or to the status inside the building.

Further, when the user selects the wire frame with floors as the map expressing the height direction of the building, the following effects can be obtained.

By deriving the Ec/No from the value obtained by subtracting the value of the transmission loss caused by a wall of a building from the value of an analysis result of radio wave propagation outside the building thereby determining the number of connectable radio base stations, the number of connectable radio base stations inside the building can be easily investigated.

By deriving the Ec/No inside the building by subtracting the value of the transmission loss from the value obtained by averaging the analysis results of the radio wave propagation around the building thereby determining the number of connectable radio base stations, the number of connectable radio base stations inside the building can be investigated while taking the analysis results of the radio wave propagation to all the sides of the building into consideration.

Second Exemplary Embodiment

In the first exemplary embodiment, as shown in FIG. 3, the information processing device 101 comprises four memory units: the map information storage unit 300, the radio system information storage unit 301, the analysis result storage unit 304, and the display condition storage unit 311, and eight function units: the analysis condition setting unit 302, the analysis unit 303, the map information processing unit 305, the display condition setting unit 306, the display information generation unit 307, the display control unit 308, the input information acquisition unit 309, and the height expressing map setting unit 310. Meanwhile, in the present exemplary embodiment, parts of these functions are distributed among one or more devices connected to and capable of communicating with the information processing device 101 via a network.

Figure 24:
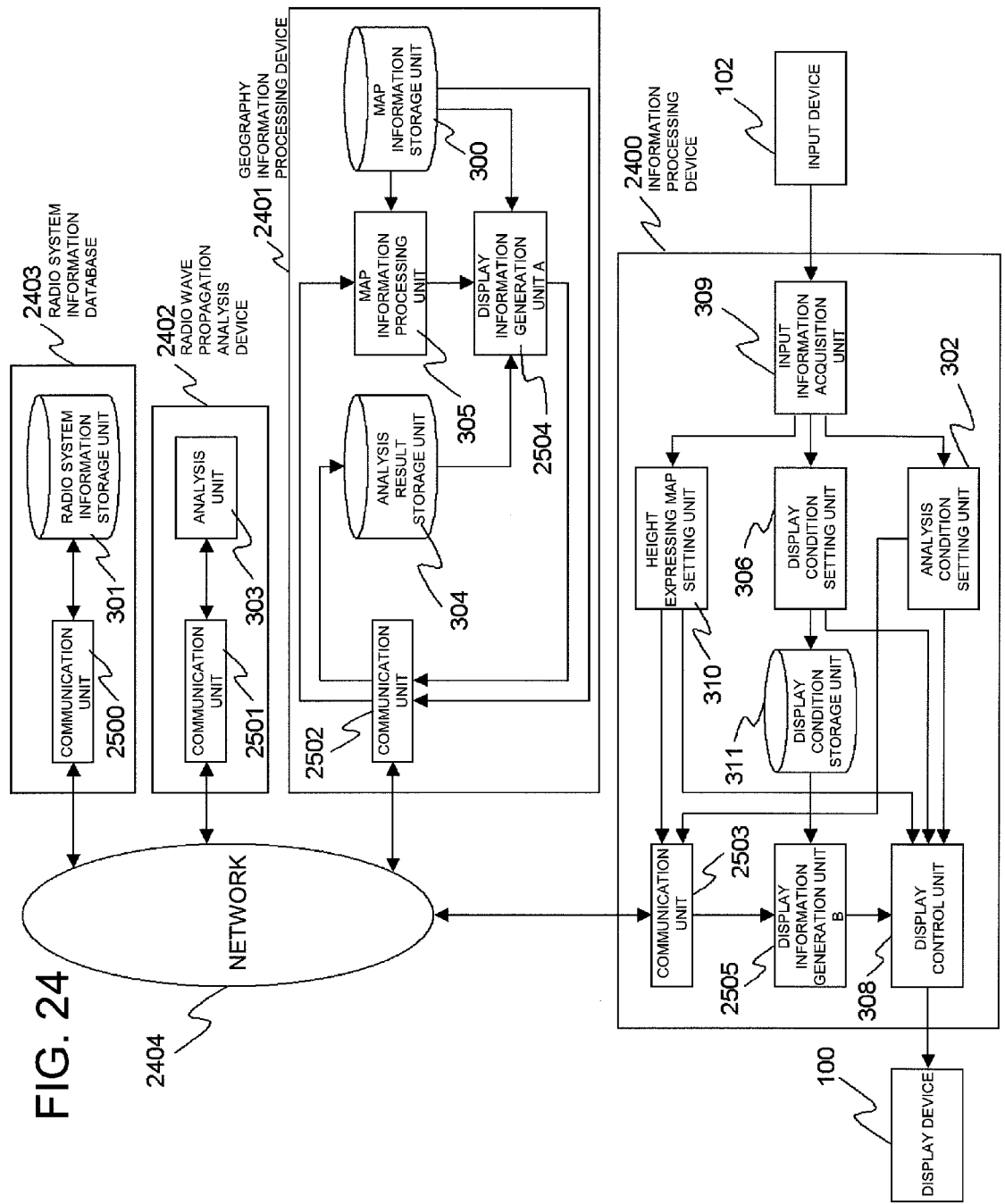
FIG. 24 is a block diagram of a radio wave propagation analysis result display system relating to a second exemplary embodiment.

With reference to FIG. 24, in a radio wave propagation analysis result display system relating to the present mode, an information processing device 2400, a geography information processing device 2401, a radio wave propagation analysis device 2402, and a radio system information database 2403 are connected to and capable of communicating with each other via a network 2404 such as the Internet.

The information processing device 2400 is connected to the input device 102 and the display device 100. Further, the information processing device 2400 comprises the analysis condition setting unit 302, the display condition setting unit 306, the display control unit 308, the input information acquisition unit 309, the height expressing map setting unit 310, and the display condition storage unit 311 as the information processing device 101 shown in FIG. 3, a display information generation unit B2505 partially functioning as the display information generation unit 307, and a communication unit 2503 that communicates with the other devices via the network 2404.

The geography information processing device 2401 comprises the map information storage unit 300, the analysis result storage unit 304, and the map information processing unit 305 as the information processing device 101 shown in FIG. 3, a display information generation unit A2504 partially functioning as the display information generation unit 307, and a communication unit 2502 that communicates with the other devices via the network 2404.

The radio wave propagation analysis device 2402 comprises the analysis unit 303 as the information processing device 101 shown in FIG. 3, and a communication unit 2501 that communicates with the other devices via the network 2404.

The radio system information database 2403 comprises the radio system information storage unit 301 as the information processing device 101 shown in FIG. 3, and a communication unit 2500 that communicates with the other devices via the network 2404.

The operation of the present exemplary embodiment is basically the same as in the first example, except for the fact that a plurality of the devices connected via the network so that they can communicate with each other cooperate to execute the radio wave propagation analysis result display processing, and the operation is roughly performed as follows along the flow shown in FIG. 6.

When the radio wave propagation analysis processing gets started by an instruction from the input device 102 (S400), the information processing device 2400 has the display information generation unit B2505 read a two-dimensional map including a radio wave propagation analysis region from the map information storage unit 300 via the communication unit 2503, the network 2404, the communication unit 2502, and the display information generation unit A2504, and displays the map in the display region A201 of the display device 100 (S401).

Next, the height expressing map setting unit 310 displays the height expressing map selection screen on the display device 100 and accepts the selection of a height expressing map from a user (S402). Then the height expressing map selection information is transmitted to the map information processing unit 305 of the geography information processing device 2401 via the communication unit 2503, the network 2404, and the communication unit 2502, the map information processing unit 305 generates a height expressing map of the type selected by the user, utilizing the three-dimensional map stored in the map information storage unit 300, and this generated three-dimensional map is transmitted to the display information generation unit B2505 via the display information generation unit 2504A, the communication unit 2502, the network 2404, and the communication unit 2503 and is displayed in the display region B202 of the display device 100 (S403).

Next, the analysis condition setting unit 302 displays the analysis condition setting screen on the display device 100 and receives conditions for the radio base station for performing the radio wave propagation analysis from the user (S404). Default values are stored in the radio system information storage unit 301, and newly set conditions for the radio base station are sent to the radio system information storage unit 301 of the radio system information database 2403 via the communication unit 2503, the network 2404, and the communication unit 2500 and stored therein.

Next, the display condition setting unit 306 displays the display condition setting screen on the display device 100 and receives the display conditions for displaying the analysis results on the display device 100 from the user (S405).

Next, the information processing device 2400 instructs the analysis unit 303 of the radio wave propagation analysis device 2402 to execute the analysis via the communication unit 2503, the network 2404, and the communication unit 2501, and the analysis unit 303 executes the radio wave propagation analysis processing (S406). At this time, the analysis unit 303 reads the radio system information from the radio system information storage unit 301 via the communication unit 2501, the network 2404, and the communication unit 2500, and reads the map information from the map information storage unit 300 via the communication unit 2501, the network 2404, and the communication unit 2502. Further, the analysis results are stored in the analysis result storage unit 304 via the communication unit 2501, the network 2404, and the communication unit 2502.

Next, the display information generation unit A2504 and the display information generation unit B2505 generate the analysis result display screen data and the display device 100 displays it (S407). In other words, the display information generation unit A2504 generates a part of the analysis result display screen based on the analysis results stored in the analysis result storage unit 304, the map capable of expressing the height generated by the map information processing unit 305, and the two-dimensional map stored in the map information storage unit 300 and transmits the part of the analysis result display screen to the display information generation unit B2505 via the communication unit 2502, the network 2404, and the communication unit 2503. The display information generation unit B2505 reads the display conditions stored in the display condition storage unit 311, completes the analysis result display screen, and displays it on the display device 100 via the display control unit 308.

Next, the information processing device 2400 waits for input from the user (S408), and performs processing corresponding to the type of the input when there is input (S409). Further, when the input is an instruction to change the display conditions, the information processing device 2400 accepts the setting change for the display conditions through the display condition setting screen as in the step S405 (S410), and by executing the processing from the step S407 again, the information processing device 2400 displays the analysis results in the display regions A201 and B202 according to the changed display conditions. Further, when the input is an instruction to change the analysis conditions, the information processing device 2400 accepts the setting change for the analysis conditions through the analysis condition setting screen (S411), as in the step S404, and by executing the processing from the step S406 again, the information processing device 2400 executes the radio wave propagation analysis processing according to the changed analysis conditions and displays the results in the display regions A201 and B202.

INDUSTRIAL APPLICABILITY

The present invention can be applied to a radio design tool that confirms radio characteristics. Further, it can be applied to a presentation tool for explaining radio design results.

It should be noted that other objects, features and aspects of the present invention will become apparent in the entire disclosure and that modifications may be done without departing the gist and scope of the present invention as disclosed herein and claimed as appended herewith. Also it should be noted that any combination of the disclosed and/or claimed elements, matters and/or items may fall under the modifications aforementioned.

The invention claimed is:

1. A radio wave propagation analysis result display system displaying an analysis result of radio wave propagation around and inside a building superimposed on the building on a map capable of expressing height direction information, the radio wave propagation analysis result display system comprising:
   a display condition storage unit that holds information specifying whether a radio wave propagation analysis result displayed on the building relates to the outside or the inside of the building; and
   a display information generation unit that displays different textures on the building between a case where an analysis result of the radio wave propagation inside the building is displayed and a case where an analysis result of radio wave propagation outside the building is displayed, and then displays each radio wave propagation analysis result superimposed on the building.

2. The radio wave propagation analysis result display system as defined in claim 1, wherein the texture displayed on the building is a window texture; and said display information generation unit displays a radio wave propagation analysis result superimposed on a window texture displayed on a wall surface of the building when an analysis result of the radio wave propagation outside the building is displayed, and displays a radio wave propagation analysis result superimposed on an external wall of the building having no window texture displayed thereon when an analysis result of the radio wave propagation inside the building is displayed.

3. The radio wave propagation analysis result display system as defined in claim 1, wherein the radio wave propagation analysis result displayed on said map capable of expressing height direction information is an electric field intensity.

4. The radio wave propagation analysis result display system as defined in claim 1, wherein the radio wave propagation analysis result displayed on said map capable of expressing height direction information is a quality judgment result obtained by comparing an electric field intensity with a predetermined threshold value.

5. The radio wave propagation analysis result display system as defined in claim 1, wherein the radio wave propagation analysis result displayed on said map capable of expressing height direction information is a judgment result, indicating whether or not the pertaining region is a handover region, derived by calculating the Ec/No of each radio base station based on the electric field intensity from each radio base station and comparing the resultant values with each other.

6. The radio wave propagation analysis result display system as defined in claim 1, wherein the radio wave propagation analysis result displayed on said map capable of expressing height direction information is a judgment result, indicating the number of connectable radio base stations, derived by calculating the Ec/No of each radio base station based on the electric field intensity from each radio base station and comparing the resultant values with each other.

7. A radio wave propagation analysis result display system displaying an analysis result of radio wave propagation inside a building on a map capable of expressing height direction information, the radio wave propagation analysis result display system comprising:

a display information generation unit that derives an analysis result of the radio wave propagation inside the building for each floor of the building by subtracting a transmission loss caused by an external wall of the building from a value obtained by weighting an analysis result of radio wave propagation in an area outside the building and close to the external wall of each side of the floor with the horizontal length of each side and averaging the resultant values, and displays the derived radio wave propagation analysis result in an area where the floor of the building is located.

8. The radio wave propagation analysis result display system as defined in claim 7, wherein said map capable of expressing height direction information is a three-dimensional map; and said display information generation unit displays the derived radio wave propagation analysis result on an external wall of each floor of each building.

9. The radio wave propagation analysis result display system as defined in claim 7, wherein said map capable of expressing height direction information is a wire frame with floors; and said display information generation unit displays the derived radio wave propagation analysis result on the surfaces of the floors.

10. The radio wave propagation analysis result display system as defined in claim 7, wherein said map capable of expressing height direction information includes a vertical cross-section of the building; and said display information generation unit displays said derived radio wave propagation analysis result on the cross-section of the building.

11. The radio wave propagation analysis result display system as defined in claim 10, wherein said display information generation unit displays an analysis result of radio wave propagation outside the building in a space area where the cross-section of the building is not displayed.

12. A radio wave propagation analysis result display method displaying an analysis result of radio wave propagation around and inside a building superimposed on the building on a map capable of expressing height direction information, wherein the method comprises:

displaying different textures on the building between a case where an analysis result of the radio wave propagation inside the building is displayed and a case where an analysis result of radio wave propagation outside the building is displayed, and then displaying each radio wave propagation analysis result superimposed on the building.

13. The radio wave propagation analysis result display method as defined in claim 12, wherein the texture displayed on the building is a window texture; and a radio wave propagation analysis result is displayed and superimposed on a window texture displayed on a wall surface of the building when an analysis result of the radio wave propagation outside the building is displayed, and a radio wave propagation analysis result is displayed and superimposed on an external wall of the building having no window texture displayed thereon when an analysis result of the radio wave propagation inside the building is displayed.

14. The radio wave propagation analysis result display method as defined in claim 12, wherein the radio wave propagation analysis result displayed on said map capable of expressing height direction information is an electric field intensity.

15. The radio wave propagation analysis result display method as defined in claim 12, wherein the radio wave propagation analysis result displayed on said map capable of expressing height direction information is a quality judgment result obtained by comparing an electric field intensity with a predetermined threshold value.

16. The radio wave propagation analysis result display method as defined in claim 12, wherein the radio wave propagation analysis result displayed on said map capable of expressing height direction information is a judgment result, indicating whether or not the pertaining region is a handover region, derived by calculating the Ec/No of each radio base station based on the electric field intensity from each radio base station and comparing the resultant values with each other.

17. The radio wave propagation analysis result display method as defined in claim 12, wherein the radio wave propagation analysis result displayed on said map capable of expressing height direction information is a judgment result, indicating the number of connectable radio base stations, derived by calculating the Ec/No of each radio base station based on the electric field intensity from each radio base station and comparing the resultant values with each other.

18. A radio wave propagation analysis result display method displaying an analysis result of radio wave propagation inside a building on a map capable of expressing height direction information, the radio wave propagation analysis result display method comprises:
deriving an analysis result of the radio wave propagation inside the building for each floor of the building by subtracting a transmission loss caused by an external wall of the building from a value obtained by weighting an analysis result of radio wave propagation in an area outside the building and close to the external wall of each side of the floor with the horizontal length of each side and averaging the resultant values, and displaying the derived radio wave propagation analysis result in an area where the floor of the building is located.

19. The radio wave propagation analysis result display method as defined in claim 18, wherein
said map capable of expressing height direction information is a three-dimensional map; and
the derived radio wave propagation analysis result is displayed on an external wall of each floor of each building.

20. The radio wave propagation analysis result display method as defined in claim 18, wherein
said map capable of expressing height direction information is a wire frame with floors; and
the derived radio wave propagation analysis result is displayed on the surfaces of the floors.

21. The radio wave propagation analysis result display method as defined in claim 18, wherein
said map capable of expressing height direction information includes a vertical cross-section of the building; and
said derived radio wave propagation analysis result is displayed on the cross-section of the building.

22. The radio wave propagation analysis result display method as defined in claim 21, comprising: displaying an analysis result of radio wave propagation outside the building in a space area where the cross-section of the building is not displayed.

23. A program causing a computer to execute displaying an analysis result of radio wave propagation around and inside a building superimposed on the building on a map capable of expressing height direction information, the program causing the computer to execute:
displaying different textures on the building between a case where an analysis result of the radio wave propagation inside the building is displayed and a case where an analysis result of radio wave propagation outside the building is displayed, and then displays each radio wave propagation analysis result superimposed on the building.

24. The program as defined in claim 23, wherein
the texture displayed on the building is a window texture; and
a computer is caused to execute a processing of displaying a radio wave propagation analysis result superimposed on a window texture displayed on a wall surface of the building when an analysis result of the radio wave propagation outside the building is displayed, and displaying a radio wave propagation analysis result superimposed on an external wall of the building having no window texture displayed thereon when an analysis result of the radio wave propagation inside the building is displayed.

25. The program as defined in claim 23, wherein the radio wave propagation analysis result displayed on said map capable of expressing height direction information is an electric field intensity.

26. The program as defined in claim 23, wherein the radio wave propagation analysis result displayed on said map capable of expressing height direction information is a quality judgment result obtained by comparing an electric field intensity with a predetermined threshold value.

27. The program as defined in claim 23, wherein the radio wave propagation analysis result displayed on said map capable of expressing height direction information is a judgment result, indicating whether or not the pertaining region is a handover region, derived by calculating the Ec/No of each radio base station based on the electric field intensity from each radio base station and comparing the resultant values with each other.

28. The program as defined in claim 23, wherein the radio wave propagation analysis result displayed on said map capable of expressing height direction information is a judgment result, indicating the number of connectable radio base stations, derived by calculating the Ec/No of each radio base station based on the electric field intensity from each radio base station and comparing the resultant values with each other.

29. A program causing a computer to execute a processing of displaying an analysis result of radio wave propagation inside a building on a map capable of expressing height direction information, the program causing the computer to execute:
a processing of deriving an analysis result of the radio wave propagation inside the building for each floor of the building by subtracting a transmission loss caused by an external wall of the building from a value obtained by weighting an analysis result of radio wave propagation in an area outside the building and close to the external wall of each side of the floor with the horizontal length of each side and averaging the resultant values, and displaying the derived radio wave propagation analysis result in an area where the floor of the building is located.

30. The program as defined in claim 29, wherein
said map capable of expressing height direction information is a three-dimensional map; and
a computer is caused to execute a processing of displaying the derived radio wave propagation analysis result on an external wall of each floor of each building.

31. The program as defined in claim 29, wherein
said map capable of expressing height direction information is a wire frame with floors; and
a computer is caused to execute a processing of displaying the derived radio wave propagation analysis result on the surfaces of the floors.

32. The program as defined in claim 29, wherein
said map capable of expressing height direction information includes a vertical cross-section of the building; and
a computer is caused to execute a processing of displaying said derived radio wave propagation analysis result on the cross-section of the building.

33. The program as defined in claim 32, causing a computer to execute: a processing of displaying an analysis result of radio wave propagation outside the building in a space area where the cross-section of the building is not displayed.

* * * * *